(12) United States Patent
Dillon

(10) Patent No.: US 9,882,970 B2
(45) Date of Patent: *Jan. 30, 2018

(54) DATA STORE INTERFACE THAT FACILITATES DISTRIBUTION OF APPLICATION FUNCTIONALITY ACROSS A MULTI-TIER CLIENT-SERVER ARCHITECTURE

(71) Applicant: Dillon Software Services, LLC, Parker, CO (US)

(72) Inventor: David M. Dillon, Parker, CO (US)

(73) Assignee: Dillon Software Services, LLC, Parker, CO (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/799,037

(22) Filed: Jul. 14, 2015

(65) Prior Publication Data

US 2015/0319229 A1 Nov. 5, 2015

Related U.S. Application Data

(63) Continuation of application No. 14/202,717, filed on Mar. 10, 2014, now Pat. No. 9,106,660, which is a
(Continued)

(51) Int. Cl.
*G06F 17/30* (2006.01)
*H04L 29/08* (2006.01)
*H04L 29/06* (2006.01)

(52) U.S. Cl.
CPC ........ *H04L 67/10* (2013.01); *G06F 17/30864* (2013.01); *H04L 67/02* (2013.01); *H04L 67/42* (2013.01)

(58) Field of Classification Search
CPC ......... G06F 17/30864; G06F 17/30321; G06F 17/30613
(Continued)

(56) References Cited

U.S. PATENT DOCUMENTS 5,918,232 A 6/1999 Pouschine et al.
6,457,017 B2 9/2002 Watkins et al.
(Continued)

OTHER PUBLICATIONS

Notice of Allowance for U.S. Appl. No. 12/833,928 dated Jan. 28, 2014.
(Continued)

*Primary Examiner* — Jeffrey A Burke
*Assistant Examiner* — Thong Vu
(74) *Attorney, Agent, or Firm* — Hamilton, DeSanctis & Cha LLP

(57) ABSTRACT

Methods and systems for facilitating distribution of application functionality across a multi-tier client-server architecture are provided. According to one embodiment, data from a database associated with a server computer system is cached into a hierarchical data map by an application running on the server computer system by instantiating multiple data points and assigning each an ephemeral ID that uniquely identifies it. Each of the data points includes a name field and a value field. A request is received by the server from a client. The request contains a value to be stored within a particular data point that is specified by its ephemeral ID. Responsive to the request, the particular data point is identified based on the ephemeral ID and the value contained in the request is transferred to the value field of the particular data point. Changed contents within the hierarchical data map are then persisted to the database.

20 Claims, 20 Drawing Sheets

Related U.S. Application Data continuation of application No. 12/833,928, filed on Jul. 9, 2010, now Pat. No. 8,676,808.

(60) Provisional application No. 61/224,465, filed on Jul. 9, 2009.

(58) Field of Classification Search
USPC .............. 707/741, 790, 103, 206; 705/26.1
See application file for complete search history.

(56) References Cited

U.S. PATENT DOCUMENTS

| | | | |
|---|---|---|---|
| 6,820,135 B1 | 11/2004 | Dingman et al. | |
| 6,959,268 B1 | 10/2005 | Myers, Jr. et al. | |
| 7,127,467 B2 | 10/2006 | Yalamanchi et al. | |
| 7,165,239 B2 | 1/2007 | Hejlsberg et al. | |
| 7,359,910 B2 | 4/2008 | Wu et al. | |
| 7,415,481 B2 | 8/2008 | Becker et al. | |
| 7,464,386 B2 | 12/2008 | Millington et al. | |
| 7,472,112 B2 | 12/2008 | Pfteiger et al. | |
| 7,505,994 B2 | 3/2009 | Ahmed et al. | |
| 7,519,577 B2 | 4/2009 | Brundage et al. | |
| 7,539,944 B2 | 5/2009 | Gauthier et al. | |
| 7,542,927 B2 | 6/2009 | Mukai | |
| 7,555,743 B2 | 6/2009 | Sridhar et al. | |
| 7,610,588 B1 | 10/2009 | Hager et al. | |
| 7,647,298 B2 * | 1/2010 | Adya | G06F 17/30418 707/999.002 |
| 7,665,073 B2 | 2/2010 | Meijer et al. | |
| 7,675,527 B2 | 3/2010 | Tilford | |
| 7,676,738 B2 | 3/2010 | Hoffmann et al. | |
| 7,702,694 B1 * | 4/2010 | Perkins | G06F 17/30297 707/790 |
| 7,702,998 B2 | 4/2010 | Kotler et al. | |
| 7,739,223 B2 | 6/2010 | Vaschillo et al. | |
| 7,900,137 B2 | 3/2011 | Ivarsoy et al. | |
| 7,934,151 B1 | 4/2011 | Castrucci et al. | |
| 7,949,637 B1 * | 5/2011 | Burke | G06F 3/0605 707/655 |
| 7,962,495 B2 | 6/2011 | Jain et al. | |
| 8,015,481 B2 | 9/2011 | Jager et al. | |
| 8,015,483 B2 | 9/2011 | Vishwanath et al. | |
| 8,024,329 B1 | 9/2011 | Rennison | |
| 8,054,496 B1 | 11/2011 | Rehfeld | |
| 8,191,040 B2 | 5/2012 | Hejlsberg et al. | |
| 8,209,661 B2 | 6/2012 | Smialek et al. | |
| 8,676,808 B2 | 3/2014 | Dillon | |
| 2002/0069222 A1 | 6/2002 | McNeely | |
| 2002/0091702 A1 | 7/2002 | Mullins | |
| 2003/0154212 A1 * | 8/2003 | Schirmer | G06Q 10/107 |
| 2003/0200212 A1 * | 10/2003 | Benson | G06F 9/466 |
| 2004/0064805 A1 * | 4/2004 | Sparago | G06F 8/20 717/120 |
| 2004/0111417 A1 | 6/2004 | Goto et al. | |
| 2005/0108206 A1 | 5/2005 | Lam et al. | |
| 2006/0047658 A1 * | 3/2006 | Baird | G06F 21/566 |
| 2006/0112090 A1 | 5/2006 | Amer-Yahia et al. | |
| 2006/0161556 A1 | 7/2006 | Dettinger et al. | |
| 2006/0230070 A1 | 10/2006 | Colton et al. | |
| 2006/0277092 A1 | 12/2006 | Williams | |
| 2007/0130172 A1 | 6/2007 | Lee | |
| 2007/0208790 A1 * | 9/2007 | Reuter | G06F 12/0253 |
| 2007/0277099 A1 | 11/2007 | Nakayama et al. | |
| 2007/0288511 A1 | 12/2007 | Zink et al. | |
| 2008/0126179 A1 * | 5/2008 | Norfolk | G06Q 30/0203 705/7.32 |
| 2008/0154873 A1 * | 6/2008 | Redlich | G06F 17/30864 |
| 2008/0222196 A1 | 9/2008 | Olivieri et al. | |
| 2009/0037514 A1 | 2/2009 | Lankford et al. | |
| 2009/0083619 A1 * | 3/2009 | Davis | G06F 17/30882 715/234 |
| 2009/0106282 A1 * | 4/2009 | Silverman | G06F 17/30914 |
| 2009/0125419 A1 * | 5/2009 | Barney | G06Q 30/0601 705/26.1 |
| 2009/0132543 A1 * | 5/2009 | Chatley | G06F 3/0613 |
| 2010/0010968 A1 * | 1/2010 | Redlich | G06F 17/30672 707/E17.014 |
| 2011/0246472 A1 | 10/2011 | Dillon | |
| 2012/0221933 A1 | 8/2012 | Heiney et al. | |
| 2014/0195601 A1 | 7/2014 | Dillon | |

OTHER PUBLICATIONS

Final Rejection for U.S. Appl. No. 12/833,928 dated Dec. 4, 2012.
Non-Final Rejection for U.S. Appl. No. 12/833,928 dated May 14, 2012.
Notice of Allowance for U.S. Appl. No. 14/202,717 dated Jun. 22, 2015.
Final Rejection for U.S. Appl. No. 14/202,717 dated Apr. 6, 2015.
Non-Final Rejection for U.S. Appl. No. 14/202,717 dated Dec. 5, 2014.
Non-Final Rejection for U.S. Appl. No. 14/202,717 dated Nov. 17, 2014.
XML Path Language (XPath) Version 1.0. W3C Recommendation Nov. 16, 1999. http://www.w3.orgITR/xpath.41 pages.

* cited by examiner

1000

Data Map Example Application

*Home   Admin   Bills   Log Out*

Customer Information
| | |
|---|---|
| Name | John Doe |
| Address | 123 Main Street |
| City | Springfield |
| State | OR |
| Zipcode | 95430 |
| Phone | 800-897-7777 |

| Qty | Description | Cost | Ext. |
|---|---|---|---|
| 10 | Metal Brackets | $5.74 | $57.40 |
| 100 | 1/4 Inch Washers | $0.10 | $10.00 |
| 25 | 1/4 X 3 Bolts | $2.39 | $59.75 |

Sales Tax Rate  5.3%

|  |  |
|---|---|
| Sub Total | $127.15 |
| Sales Tax | $6.74 |
| Shipping & Handling | $5.00 |
| Grand Total | $138.89 |

[UPDATE]

Configuration
New Def — 1410

| Key | Source |
|---|---|
| Engagement | com.website.engagement.datasource.LoadEngagement |
| ExtendedParts | com.dillonss.jsp.datasource.CreateString |
| MapDefinition | com.website.datamap.datasource.LoadDATAMAPDEF |
| ProductLine | com.website.solutions.LoadProductLine |
| ProductLines | com.dillonss.jsp.datasource.CreateString |
| Resources | com.dillonss.jsp.datasource.CreateXMLDOCUMENT |
| SAPAddressSearch | com.dillonss.jsp.datasource.CreateString |
| XMLEditor | com.website.xmleditor.datasource.LoadXMLDOCUMENT |
| XMLSelector | com.dillonss.jsp.datasource.CreateString |

FIG. 14

Back   Edit   Promote   Delete

Map Definition: BillOrder
1510

| Key | Global |
|---|---|
| BillOrder | Global |

Sub Maps

∨ CustomerInfo    Global — 1520
∨ GrandTotal       Global — 1530
∨ Items — 1540    Global
∨ SalesTax          Global — 1550
∨ SubTotal          Global — 1560
∨ TaxRate           Global Add
1570

Data Source 1575
com.website.datasamplexample.datasource.LoadBill com.ditones.jsp.datasource.CreateDATANODE
com.ditones.jsp.datasource.CreateDATASTRING
com.ditones.jsp.datasource.CreateDATANODE
com.ditones.jsp.datasource.CreateDATASTRING
com.ditones.jsp.datasource.CreateDATASTRING
com.ditones.jsp.datasource.CreateDATASTRING

Data Source Parameters

| Key | Value |
|---|---|
| Global | |

Add

Data Point Configuration

| Key | Global | Default | Formula |
|---|---|---|---|

Add

DATA STORE INTERFACE THAT FACILITATES DISTRIBUTION OF APPLICATION FUNCTIONALITY ACROSS A MULTI-TIER CLIENT-SERVER ARCHITECTURE

CROSS-REFERENCE TO RELATED APPLICATIONS

This application is a continuation of U.S. patent application Ser. No. 14/202,717, filed Mar. 10, 2014, now U.S. Pat. No. 9,106,660, which is a continuation of U.S. patent application Ser. No. 12/833,928, filed on Jul. 9, 2010, now U.S. Pat. No. 8,676,808, which claims the benefit of priority to U.S. Provisional Patent Application No. 61/224,465, filed on Jul. 9, 2009, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2009-2015, Dillon Software Services, LLC.

BACKGROUND

Field

Embodiments of the present invention generally relate to data store interface technology to facilitate application development. More specifically, embodiments of the present invention provide a mechanism to facilitate distribution of application functionality across a multi-tier client-server architecture.

Description of the Related Art

Traditional spreadsheets such as Microsoft Excel or Lotus 1-2-3 allow the direct entry of data or formulas into cells with real-time auto calculations that automatically update the values displayed in other cells.

However, with the proliferation of the Internet and multi-tier client server architectures, the present form of the spreadsheet is difficult to integrate.

Some applications attempt to transport the entire spreadsheet across the network to the client, but this is inefficient and not in accord with the multi-tier client server architecture.

Therefore, there is a need to divide the functions of applications, such as spreadsheets, across the client server architecture, including the data store.

SUMMARY

Methods and systems are described for facilitating distribution of application functionality across a multi-tier client-server architecture. According to one embodiment, data from a database associated with a server computer system is cached into a hierarchical data map by an application running on the server computer system by instantiating multiple data points within the hierarchical data map and assigning each data point an ephemeral ID that uniquely identifies the data point. Each of the data points also includes a name field and a value field. A request is received by the server computer system from a client computer system. The request contains a value to be stored within a particular data point and specifies the particular data point by its ephemeral ID. Responsive to the request, the particular data point to be updated by the request is identified by the application based on the ephemeral ID specified in the request and the value contained in the request is transferred to the value field of the particular data point. Changed contents within the hierarchical data map are then persisted by the application to the database.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 10 is a screen shot of a web enabled spread sheet application built upon the data store interface technology in accordance with an embodiment of the present invention.

FIG. 12 illustrates an unmerged HyperText Markup Language (HTML) template file corresponding to the screen shot of FIG. 10.

FIG. 14 illustrates a simple web-based tool used to manage and store DataMap definitions in accordance with an embodiment of the present invention.

FIG. 15 illustrates a simple interface that provides a user with links to create a new DataMap definition in accordance with an embodiment of the present invention.

DETAILED DESCRIPTION

Figure 1:
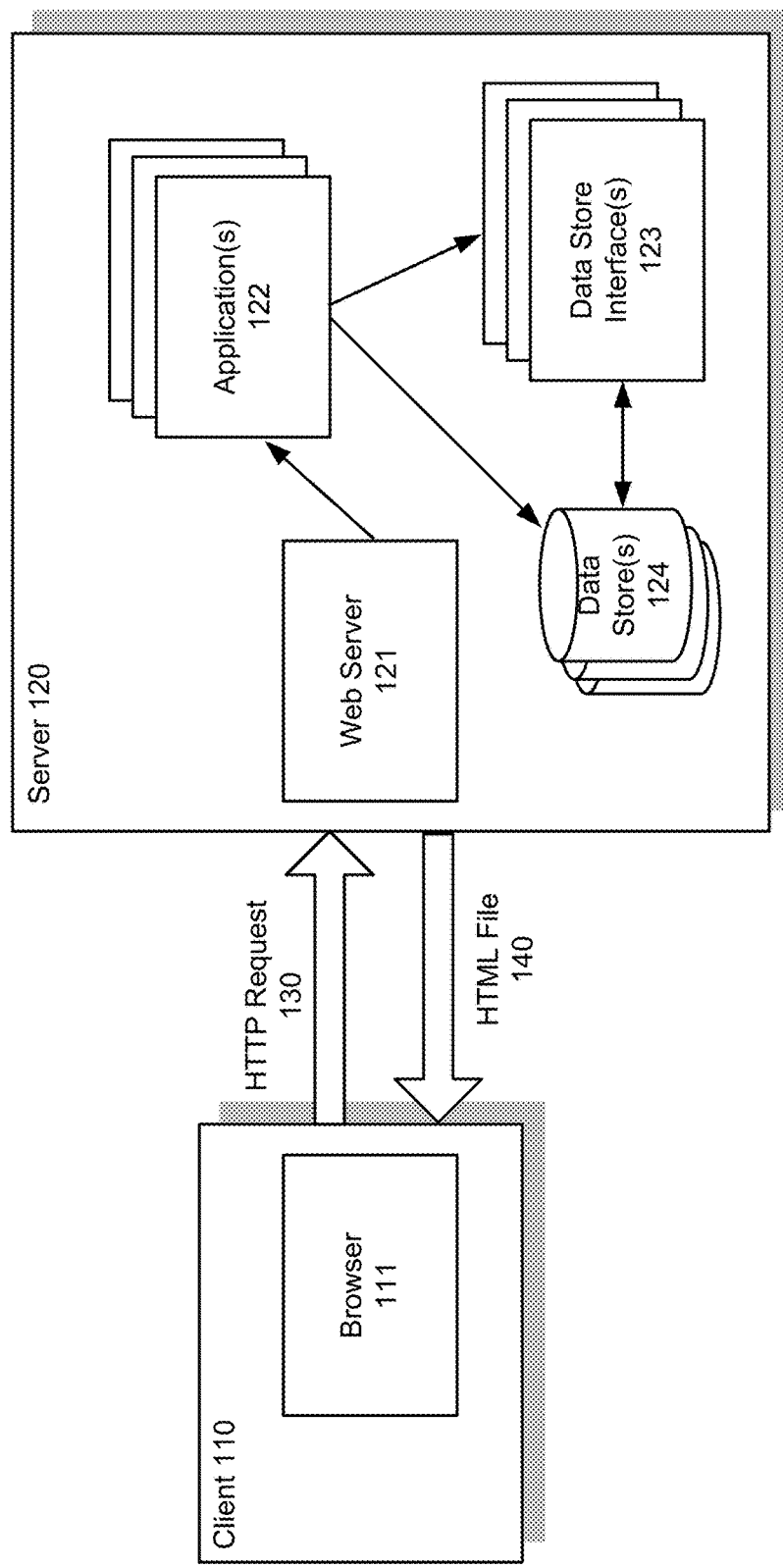
FIG. 1 conceptually illustrates a high-level client-server architecture in accordance with an embodiment of the present invention.

Methods and systems are described for facilitating distribution of application functionality across a multi-tier client-server architecture. According to one embodiment, data and corresponding definitions, structure and relationships are decoupled, thereby allowing appropriate implementations to be defined by an application while a data store interface manages an in-memory DataMap hierarchy. According to one embodiment, intuitive expressions, referred to as index path expressions, can be used by an application developer to index into the DataMap hierarchy.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 conceptually illustrates a high-level client-server architecture 100 in accordance with an embodiment of the present invention. According to the present example, a client 110 and a remote server 120 communicate via a network (not shown), such as the Internet, a local area network (LAN), a wide area network (WAN) or the like.

Server 120 includes a web server 121, one or more applications 122, one or more data stores 124 and corresponding data store interfaces 123. Applications 122 may include those offering database and/or spreadsheet-type functionality. Each of the applications 122 may have a corresponding data store and data store interface.

As described further below, data store interface(s) 123 provide a hierarchical structure in which data from data store(s) 124 can be cached in memory in the form of DataMaps, DataNodes and DataPoints. The data store interface(s) 123 also provide mechanisms for merging input content, such as that received from client 110 via an HyperText Transport Protocol (HTTP) request 130, with an HTML template, for example, containing desired layout and embedded tags to produce output content, such as HTML file 140.

In the context of an application that provides spreadsheet-type functionality, embodiments of the present invention facilitate distribution of spreadsheet functions, such as visualization, data caching, structure, formulas, format and value constraints across multiple tiers of the client-server architecture 100. For example, as described further below visualization may be provided by the client 110, data store interface(s) 123 may perform data caching via an in-memory data source and application(s) may provide information regarding the structure and relationships of DataMaps, DataNodes and DataPoints as well as implementation of formulas, formats and value constraints associated with DataPoints.

In the current example, client 110 executes a browser 111 (e.g., a web browser, including, but not limited to existing web browsers, e.g., Internet Explorer, Chome, Firefox, Safari and the like, subsequent releases thereof and/or future web browsers) to provide a browser-based interface to one or more applications 122 running on the server 120. As illustrated below, an end-user of client 110 may query, update or otherwise access information in the data store(s) 124 by interacting with pages displayed by browser 111.

Figure 2:
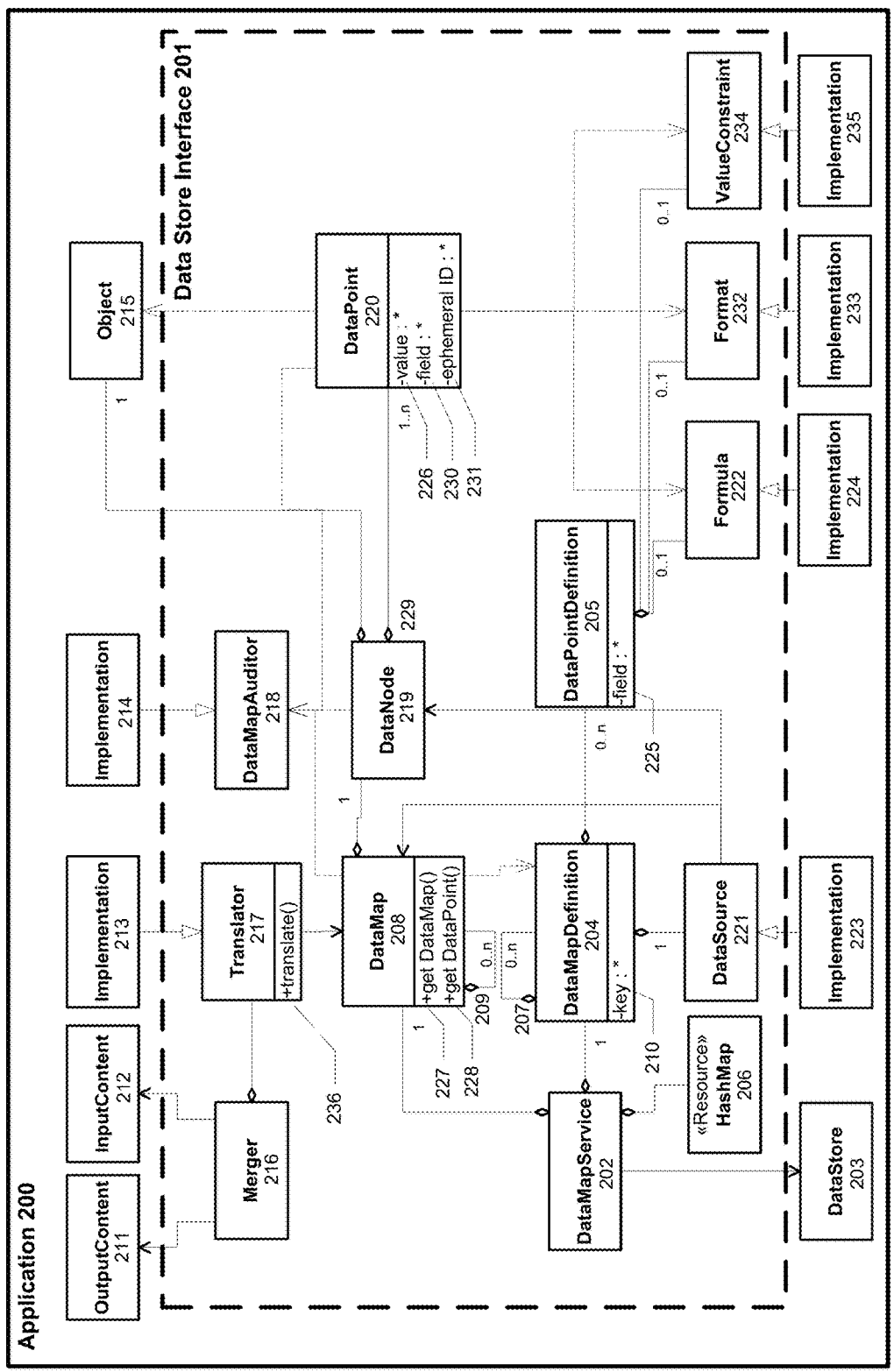
FIG. 2 is a Unified Modeling Language (UML) class diagram illustrating various classes of a data store interface and exemplary interactions with an application in accordance with an embodiment of the present invention.

FIG. 2 is a Unified Modeling Language (UML) class diagram illustrating various classes of a data store interface 201 and exemplary interactions with an application 200 in accordance with an embodiment of the present invention. According to the static illustration provided by FIG. 2, the data store interface 201 defines classes, including, DataMapService 202, DataMapDefinition 204, DataPointDefinition 205, DataMap 208, DataNode 219, DataPoint 220, Merger 216, Translator 217 and DataMapAuditor 218, which when instantiated provide the application 200 with data structures and procedures for accessing and manipulating the DataMap hierarchy.

According to one embodiment, an instance of DataMapService 202 has the following features: (i) a reference to an instance of a DataStore 203, (ii) a resource map 206, (iii) a reference to an instance of a DataMapDefinition 204 and (iv) a reference to an instance of a DataMap 208.

The DataStore 203 is where information used to construct DataMapDefinitions 204 and DataPointDefinitions 205 is located. According to one embodiment the DataMapDefinitions 204 may be stored in an XML file. In other embodiments, the software framework as described in U.S. Pat. No. 7,412,455 is used to manage and store DataMapDefinitions 204. U.S. Pat. No. 7,412,455 is hereby incorporated by reference in its entirety for all purposes.

The resource map 206 contains key/value pairs that the Application 200 uses to convey additional information to objects relative to the DataMapService 202.

The DataMapDefinition 204 represents a hierarchical collection of DataMapDefinition 207 objects.

The DataMap 208 represents a hierarchical collection of DataMap objects 209 corresponding to the collection of the DataMapService's 202 DataMapDefinitions 204.

In one embodiment, the DataMapDefinition 204 has the following features: (i) a reference 207 to its parent DataMapDefinition 204, (ii) a key 210, (iii) a reference to a DataSource 221.

The reference 207 to the parent DataMapDefinition 204 may be null (or undefined) implying the DataMapDefinition 204 is the root of a hierarchy.

The key 210 uniquely distinguishes the DataMapDefinition 204 amongst its peers, relative to its parent 207. The parent 207 and key 207 attributes enable the hierarchical nature of DataMapDefinition 204.

The DataSource 221 is an interface to an object, i.e., implementation 223, implemented by the Application 200, which is used to: (i) gather information from an arbitrary DataStore 203; (ii) construct one or more DataMaps 208 from the gathered information; and (iii) register the newly constructed DataMaps 208 with the DataMapService 202.

According to one embodiment, the DataPointDefinition 205 has the following features: (i) a reference to its hosting DataMapDefinition 204, (ii) a field 225, (iii) an optional reference to a formula 222, (iv) an optional reference to a format 232 and (v) an optional reference to a value constraint 234.

Field 225 uniquely distinguishes the DataPointDefinition 205 amongst its peers that are hosted by a common DataMapDefinition 204.

The optional formula 222 is an interface to an object, i.e., implementation 224, implemented by the Application 200, which is used to calculate a value attribute 226 of a DataPoint 220 corresponding to the DataPointDefinition 205.

The optional format 232 is an interface to an object, i.e., implementation 233, implemented by the Application 200, which may be used by a Translator 217 or Application derivative, i.e., implementation 213, to format an expression used to represent the value attribute 226 of a DataPoint 220.

The optional value constraint 234 is an interface to an object, i.e., 235, implemented by the Application 200, which may be used by the Application 200 to verify the conformance of a value assigned to a value attribute 226 of a DataPoint 220 to one or more rules, i.e., implementation 235, implemented by the Application 200. The value constraint 234 may throw an exception or send a signal to indicate the value does not conform to the one or more rules.

According to one embodiment, DataMap 208 has the following features: (i) a reference to a DataMapDefinition 204, (ii) a reference to its parent 209 DataMap 208, (iii) a reference to a DataNode 219, (iv) a collection of unique key/value pairs 209, (v) a get DataMap method 227 and (vi) a get DataPoint method.

The DataMapDefinition 204 contains the DataSource 221 by which the DataMap 208 was constructed.

The reference to the parent 209 DataMap 208 may be null (or undefined) implying the DataMap 208 is the root of a hierarchy.

The DataNode 219 creates DataPoints 220 that are used to put/get information in/from a data object 215 provided by the Application 200.

The values of the collection of unique key/value pairs 209 correspond to subordinate DataMaps 208.

The get DataMap method 227 accepts an ordered set of keys (objects) and returns the resulting DataMap 208. Each key in the ordered set corresponds to a key that uniquely identifies a subordinate DataMap 208. The index of the key in the ordered set corresponds to the level of the hierarchy.

The get DataPoint method 228 accepts an ordered set of keys (objects) and a "field name" and returns a DataPoint 220. Each key in the ordered set corresponds to a key that uniquely identifies a subordinate DataMap 208. The index of the key in the ordered set corresponds to the level of the hierarchy. Referencing a DataMap 208 at that hierarchy, returns a DataPoint 220 from the DataMap 208 corresponding to the "field name".

According to one embodiment, DataNode 219 has the following features: (i) a reference to its hosting DataMap 208 and (ii) a collection of unique key/value pairs 229. The keys of the collection of unique key/value pairs 229 correspond to the fields 230 of the DataPoint 220 and the values 229 correspond to the DataPoint 220. If a DataPointDefinition 205 is defined, the field 230 is equivalent to the key 225 of the DataPointDefinition 205.

According to one embodiment, DataPoint 220 has the following features: (i) an optional reference to a formula 222, (ii) an optional reference to a format 232, (iii) an optional reference to a value constraint 234 (iv) an ephemeral ID 231 and (v) a reference to its hosting DataNode 219.

As described above, the optional formula 222 is an interface to implementation 224, an object implemented by the Application 200 used to calculate a value attribute 226 of a DataPoint 220 corresponding to the DataPointDefinition 205.

As described above, the optional format 232 is an interface to implementation 233, an object implemented by the Application 200, used by translator 217 or implementation 213 to format an expression used to represent the value attribute 226 of a DataPoint 220.

As described above, the optional value constraint 234 is an interface to implementation 235, an object implemented by the Application 200, used by the Application 200 to verify the conformance of a value assigned to a value attribute 226 of a DataPoint 220 to implementation 235, one or more rules implemented by the Application 200. The value constraint 234 may throw an exception or send a signal to indicate the value does not conform to the one or more rules. In some embodiments, additional optional attributes may be provided to support other features relating to input, display or derivation of the value attribute of the DataPoint, for example.

The ephemeral ID 231 uniquely identifies the instance of the DataPoint 220 from all DataPoints 220 associated with a DataMap 208. The value of the ephemeral ID 231 is established when the DataPoint 220 is created. As discussed further below, the ephemeral ID 231 is typically used in a client-server architecture to allow the client and server to efficiently communicate information regarding DataPoints 220.

According to one embodiment, Merger 216 has the following features: (i) a reference to InputContent, (ii) a reference to a translator 217 and (iii) a reference to OutputContent 211.

InputContent 212 is a file or other input stream of information that Merger 216 parses or analyzes, searching for expressions that will determine content to be replaced by Translator 217.

Translator 217 is a class that is optionally extended by the Application 200 via implementation 213. Responsive to a call by Merger 216, Translator 217 or 213 returns content containing expressions corresponding to value attributes 226 from DataPoints 220 and which may have been formatted by Format 232 or 233.

OutputContent 211 is a file or other output stream of information that Merger 216 writes based on the stream of information from InputContent 212 and any information replaced by Translator 217 or 213.

According to one embodiment, Translator 217 is a class that may be optionally extended by the Application 200 via implementation 213. Translator 217 has the following features: (i) a reference to a DataMap 208 and (ii) a translate method 236.

Responsive to an invocation by Merger 216, the translate method 236 provides parameters to describe the expression to be translated. Translator 217 uses DataMap 208 to reference a value attribute 226 of a DataPoint 220 and uses that value to create an expression that is returned to Merger 216.

According to one embodiment, DataMapAuditor 218 is an interface to implementation 214, an object implemented by the Application 200, which is used to receive notification of the existence of every DataMap 208, DataNode 219 and DataPoint 220 subject to a DataMap's 208 hierarchy.

Figure 3:
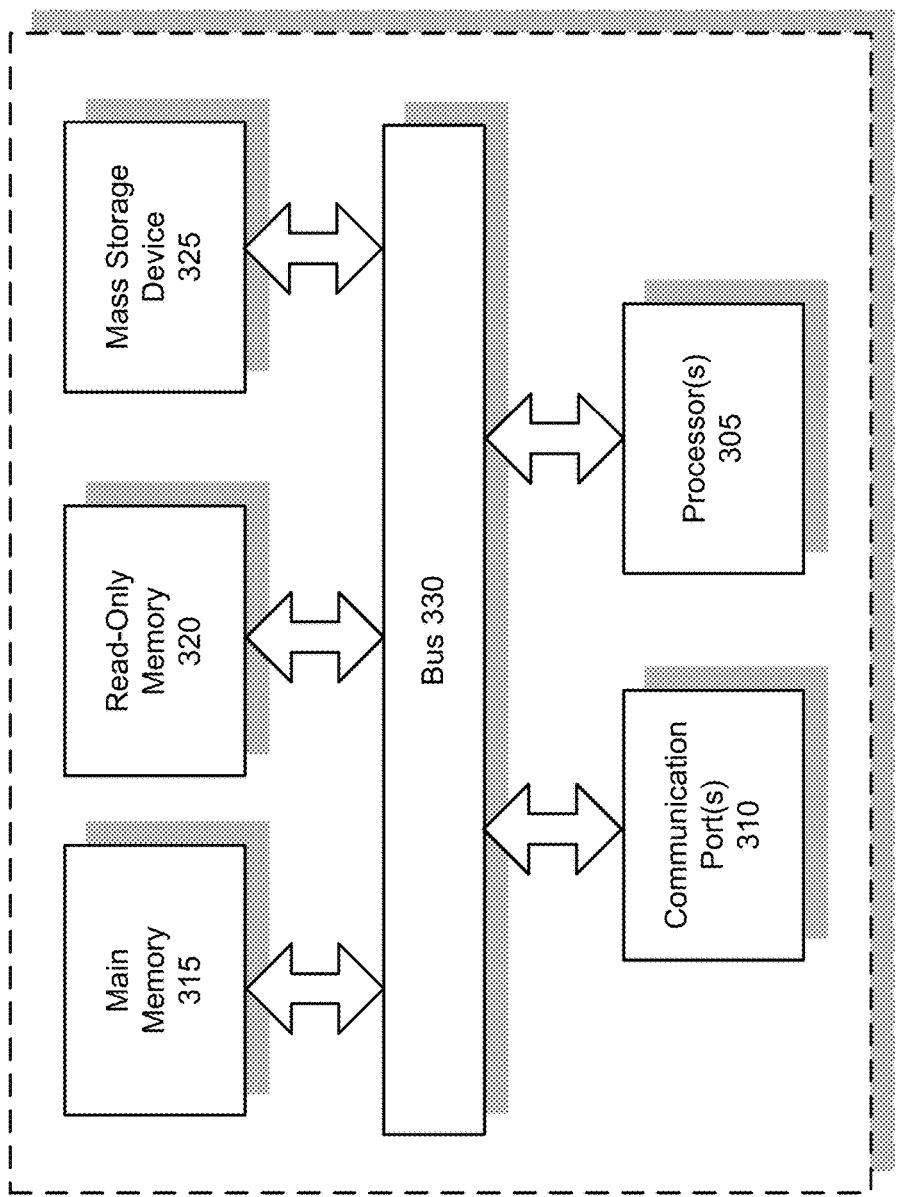
FIG. 3 is an example of a computer system with which embodiments of the present invention may be utilized.

FIG. 3 is an example of a computer system with which embodiments of the present invention may be utilized. Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 3 is an example of a computer system 300, such as a workstation, personal computer, laptop, client or server upon which or with which embodiments of the present invention may be employed.

According to the present example, the computer system includes a bus 330, one or more processors 305, one or more communication ports 310, a main memory 315, a removable storage media 340, a read only memory 320 and a mass storage 325.

Processor(s) 305 can be any future or existing processor, including, but not limited to, an Intel® Itanium® or Itanium 2 processor(s), or AMD® Opteron® or Athlon MP® processor(s), or Motorola® lines of processors. Communication port(s) 310 can be any of an RS-232 port for use with a modem based dialup connection, a 10/100 Ethernet port, a Gigabit port using copper or fiber or other existing or future ports. Communication port(s) 310 may be chosen depending on a network, such a Local Area Network (LAN), Wide Area Network (WAN), or any network to which the computer system 300 connects.

Main memory 315 can be Random Access Memory (RAM), or any other dynamic storage device(s) commonly known in the art. Read only memory 320 can be any static storage device(s) such as Programmable Read Only Memory (PROM) chips for storing static information such as start-up or BIOS instructions for processor 305.

Mass storage 325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 330 communicatively couples processor(s) 305 with the other memory, storage and communication blocks. Bus 330 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 305 to system memory.

Optionally, operator and administrative interfaces, such as a display, keyboard, and a cursor control device, may also be coupled to bus 330 to support direct operator interaction with computer system 300. Other operator and administrative interfaces can be provided through network connections connected through communication ports 310.

Removable storage media 340 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the invention.

Figure 4:
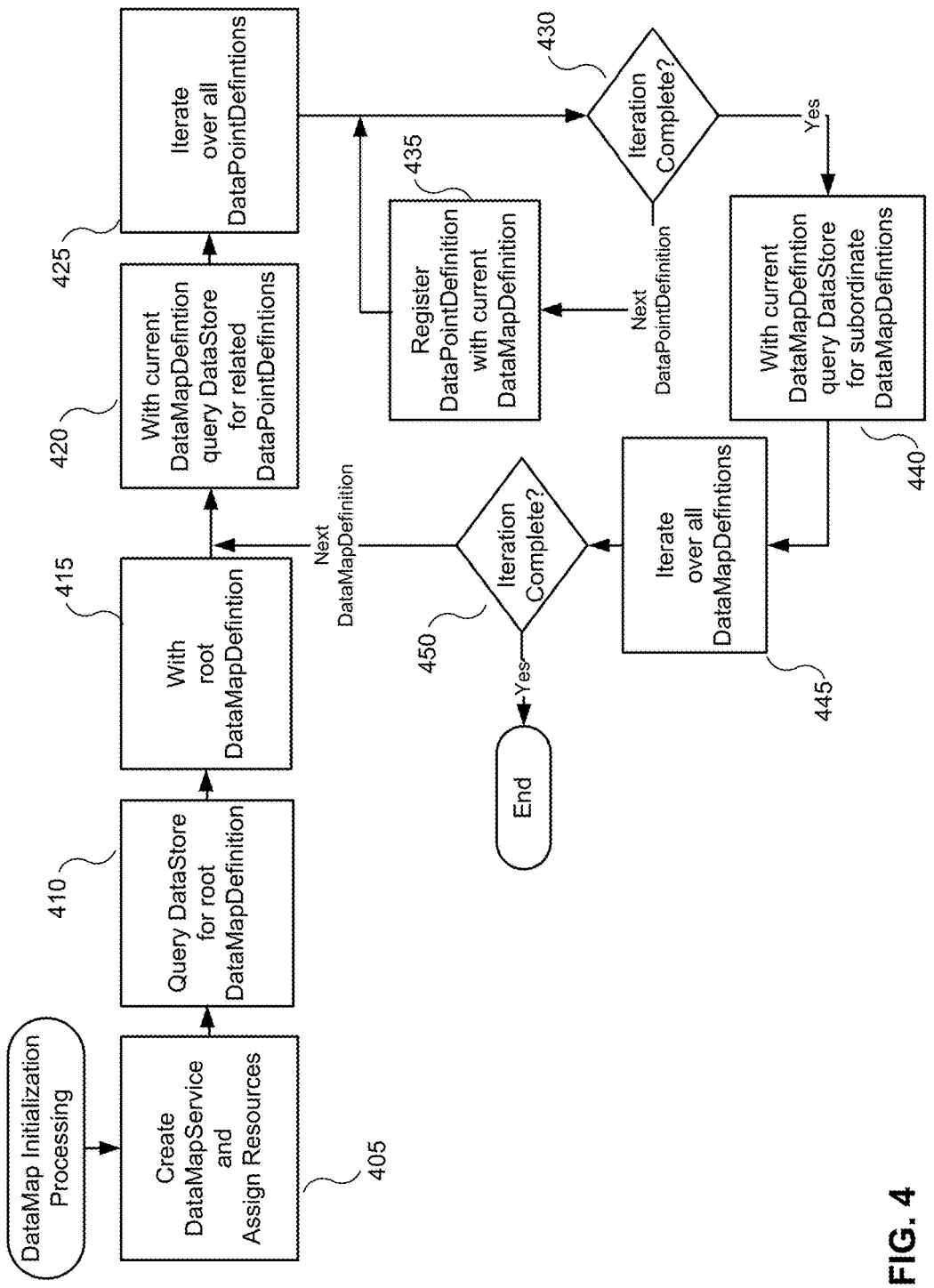
FIG. 4 is a flow diagram illustrating datamap service initialization processing in accordance with an embodiment of the present invention.

FIG. 4 is a flow diagram illustrating datamap service initialization processing in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 405, a datamap service is created and assigned resources. For example, an application, such as application 200, may create a new instance of DataMapService 202 providing the new instance with parameters sufficient to initialize a collection of datamap definitions, such as DataMapDefinitions 204, from information in a data store, such as DataStore 203. According to one embodiment, the application may invoke a method of the datamap service to cause it to initialize.

At block 410, the data store is queried to identify the root datamap definition. According to one embodiment, using parameters supplied by the application, the datamap service creates a statement to query DataStore 203 for information used to construct a root DataMapDefinition 204. The information typically used to construct a DataMapDefinition 204 includes:

An expression, such as a string or number, which uniquely identifies a parent DataMapDefinition 204. If this information is null or otherwise undefined, the DataMapDefinition 204 is assumed to be a root. Note that DataMapService 202 uses this expression to consummate the hierarchical relationship between the parent and subordinate DataMapDefinitions 204.

An expression, such as a string or number, which uniquely identifies the DataMapDefinition 204 from its peers, relative to its parent DataMapDefinition 204.

An expression, such as a string or number, which can be used to construct an instance of a DataSource 221. The expression can be used in conjunction with a look-up table to determine what DataSource 221 to use, or with language reflection such as Java to construct an instance of an object directly.

At block 415, the current datamap definition is set to the root DataMapDefinition and the initialization process continues with block 420.

At block 420, using the current datamap definition, the data store is queried for data point definitions. According to one embodiment, a statement is created to query DataStore 203 for information used to construct a collection of DataPointDefinitions 205. The information used to construct a DataPointDefinition 205 typically includes:

An expression, such as a string or number, which uniquely identifies its hosting DataMapDefinition 204. DataMapService 202 uses this expression to look up the reference to the hosting DataMapDefinition 204.

An expression, such as a string or number, which is used as a key or "field name" that uniquely identifies the DataPointDefinition 204 among all DataPointDefinitions 204 hosted by a common DataNode 219.

An optional expression, such as a string or number, which is used to construct an instance of a Formula 222. The expression can be used in conjunction with a "look-up" table to determine what Formula 222 to use, or with language reflection such as Java to construct an instance of an object directly, or in conjunction with a "4th generation language" parser that interprets the expression and implements the Formula interface. If the expression is null or otherwise undefined, it is assumed that a Formula 222 should not be used.

An optional expression, such as a string or number, which is used to construct an instance of a Format 232. The expression can be used in conjunction with a "look-up" table to determine what Format 232 to use, or with language reflection such as Java to construct an instance of an object directly, or in conjunction with a "4th generation language" parser that interprets the expression and implements the Format interface. If the expression is null or otherwise undefined, it is assumed that a Format 232 should not be used.

An optional expression, such as a string or number, which is used to construct an instance of a ValueConstraint 234. The expression can be used in conjunction with a "look-up" table to determine what ValueConstraint 234 to use, or with language reflection such as Java to construct an instance of an object directly, or in conjunction with a "4th generation language" parser that interprets the expression and implements the ValueConstraint interface. If the expression is null or otherwise undefined, it is assumed that a ValueConstraint 234 should not be used.

At blocks 425, 430 and 435, the collection of DataPointDefinitions 205 returned by the query of block 420 are iterated over to register each DataPointDefinition 205 with the current DataMapDefinition 204, until the iteration completes.

At block 440, after the registration of DataPointDefinitions 205 has been completed, using the current DataMapDefinition 204, a statement is created to query the DataStore 203 for information used to create a collection of DataMapDefinitions 204 that are subordinate to the current DataMapDefinition 204. The statement used for the query explicitly contains an expression (e.g., a string or number) that uniquely identifies the current DataMapDefinition as the parent.

At blocks 445 and 450, the collection of subordinate DataMapDefinitions returned by the query of block 440 are iterated over; where each subordinate DataMapDefinition is further processed as a current datamap definition, until the iteration completes. The initialization process ends upon completion of the iteration at block 450 when no further subordinate DataMapDefinitions remain.

Figure 5:
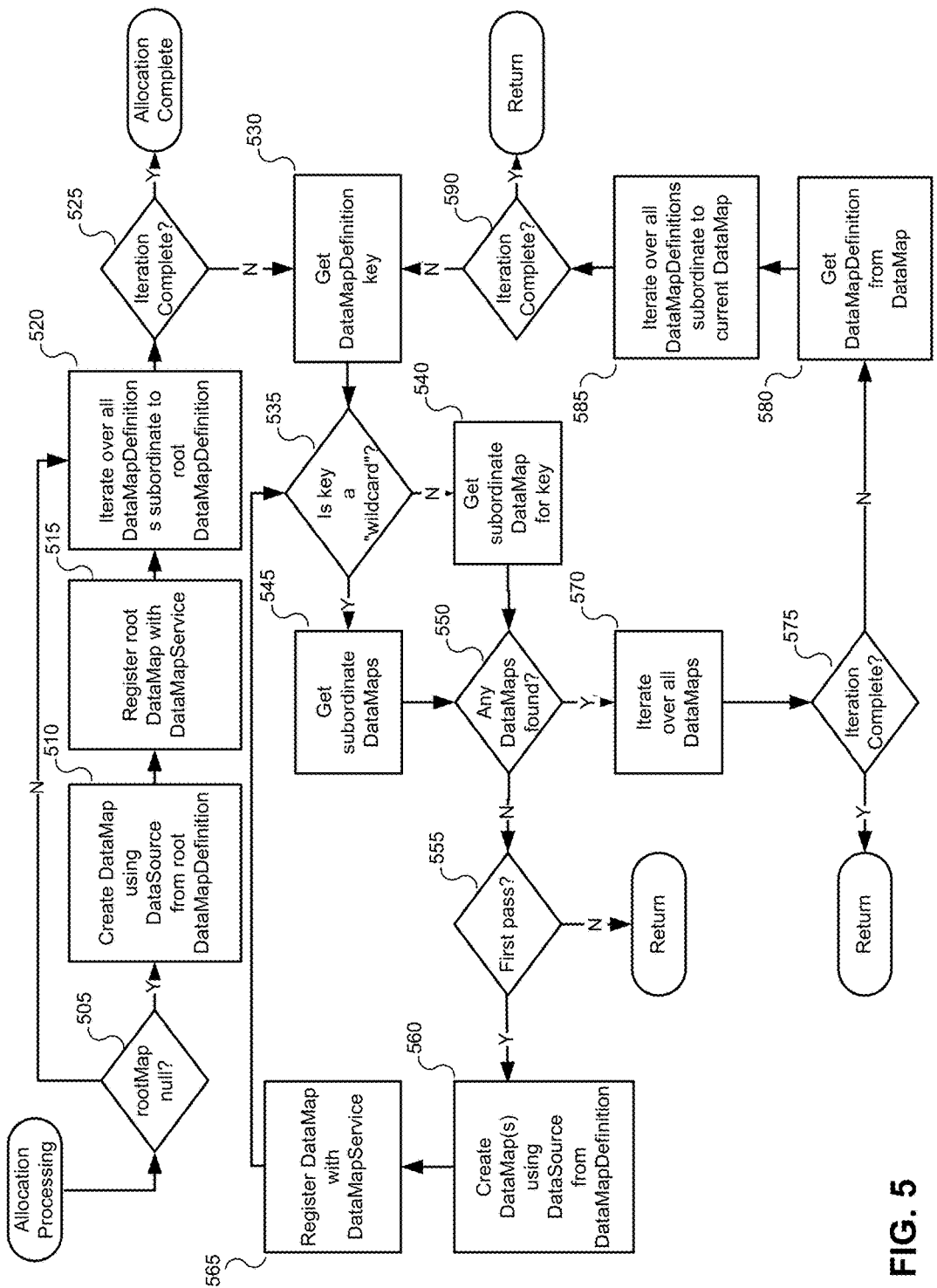
FIG. 5 is a flow diagram illustrating allocation of a datamap in accordance with an embodiment of the present invention.

FIG. 5 is a flow diagram illustrating allocation of a datamap in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

According to one embodiment, a datamap service, such as DataMapService 202, provides an allocation method that causes its datamap, such as DataMap 208, to be fully allocated, or re-allocated; which means all information that is available in the set of data stores, such as DataStores 203, as determined by the DataSources 221 referenced within the hierarchy of the DataMapDefinition 204 will be read from the DataStores 203 and loaded into the a hierarchy of DataMaps 208, and their respective DataNodes 219 in accordance with the hierarchy of the DataMapDefinition 204.

The allocation method can be invoked for many reasons. For example, just after the Application 200 initializes the DataMapService 202, in preparation for interaction with the DataMap 208; or the Application 200 may also invoke the allocation method after it has determined the hierarchy should be reconstructed. For example, the Application 200 may reconstruct the hierarchy if it determines information in one or more DataStores 203 used to create the DataMap 208 has changed in some way.

At decision block 505, the allocation processing process first determines if the root DataMap has yet to be allocated by determining if the root DataMap is null. If so, the processing continues with block 510; otherwise processing branches to block 515.

At block 510, a root DataMap is created using the DataSource 221 from the root DataMapDefinition 205.

At block 515, the DataSource 221 registers the root DataMap with the DataMapService 202 using the key from the root DataMapDefinition 204.

At block 520, the collection of DataMapDefinitions 204 that are subordinate to the root DataMapService 202 are referenced and iterated over.

At decision block 525, it is determined that the iteration is not complete, then the process continues and references the [subordinate] DataMapDefinition key at block 530. Otherwise, the process is complete and the DataMap has been fully allocated.

At decision block 535, it is determined if the key is equivalent to the "wildcard." The object or value used as the "wildcard" may be specified by the Application, but is by default the string expression "*". If the key is a wildcard, then processing continues with block 545 in which all the subordinate DataMaps are referenced; otherwise processing branches to block 540 in which only one subordinate DataMap as determined by the key is referenced.

At decision block 550, it is determined if any subordinate DataMaps were found. If so, then the resulting collection is referenced and iterated over; otherwise processing continues with decision block 555.

While the iteration is not complete as determined by decision block 575, for each DataMap, its DataMapDefinition is referenced at block 580 and it's collection of subordinate DataMapDefinitions are referenced and iterated over at block 585. When the iteration is complete as determined by decision block 590, the process returns back to decision block 575 or decision block 525, depending on the leading sequence. If the iteration is not complete, the process continues and references the [subordinate] DataMapDefinition key at block 530.

At decision block 575, if the iteration is complete, the process returns to decision block 590 or to decision block 525, depending on the leading sequence.

At decision block 555, if no subordinate DataMaps were found as determined by decision block 550, then it is determined whether this is the first pass through decision block 535. If so, then processing continues to block 560; otherwise processing returns to decision block 590 or decision block 525, depending on the leading sequence.

At block 560, one or more DataMaps may be created using the DataSource from the DataMapDefinition.

At block 565, any DataMaps created at block 560 are registered with the DataMapService, using a key based on the DataMapDefinition key and returns to decision block 535. If the DataMapDefinition key is equivalent to the "wildcard," DataSource uses an object like a string or number that is guaranteed to be unique relative to all DataMaps at that hierarchical level; typically the object is the primary ID of the information obtained from the DataStore, but may use some other object in agreement with the Application. If the DataMapDefinition key is not equivalent to the "wildcard", DataSource typically uses the DataMapDefinition key, but may use some other object in agreement with the Application.

Note that in block 560, DataSource may have determined there was no information in the DataStore to cause the creation of any DataMaps. In that case, as a consequence, at decision block 550, no DataMaps will be found and processing will ultimately take the "No" path at decision block 555 and return to decision block 590 or decision block 525, depending on the leading sequence.

Figure 6:
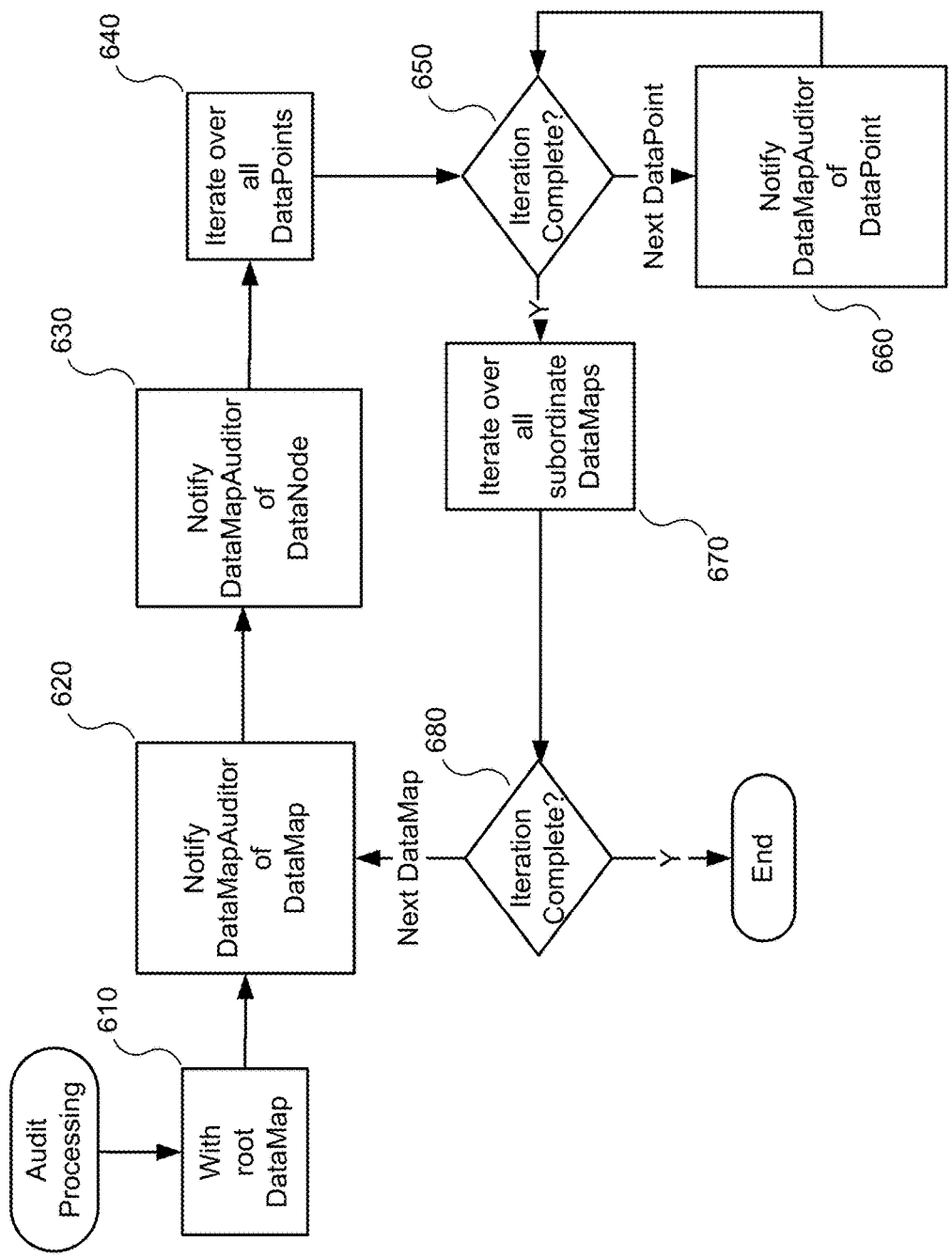
FIG. 6 is a flow diagram illustrating auditing of a datamap in accordance with an embodiment of the present invention.

FIG. 6 is a flow diagram illustrating auditing of a datamap in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

In the present example, the auditing process begins at block 610 with a root DataMap. The root DataMap is typically the same object as the DataMapService's root DataMap, but any DataMap can serve as the root DataMap.

At block 620, the DataMapAuditor is notified of the DataMap.

At block 630, the DataMapAuditor is notified of the DataMap's DataNode. The Application object hosted by the DataNode is typically of more interest to the Application than the DataNode.

At block 640, the collection of DataPoints hosted by the DataNode are then referenced and iterated over.

At block 208, for each DataPoint in the collection, the DataMapAuditor is notified of the DataPoint. When the iteration over DataPoints is complete as determined by decision block 650, the DataMaps subordinate to the current DataMap are referenced at block 670 and iterated over. The process of repeating blocks 620-680 continues with block 620 until iteration of subordinate DataMaps is complete as determined by decision block 680, at that point the audit process ends.

As described above, DataMapService 202 may provide an audit method to audit the objects in the DataMap hierarchy. The Application 200 may implement the DataMapAuditor interface according to a specific set of requirements. For example, a requirement may be that the Application must persist objects of a certain class type that are hosted by DataNodes to a DataStore. In this context, the Application will audit the DataMap and collect references to objects of the matching the class type, and at the completion of the audit, will persist the collection of objects to a DataStore.

In a different example, a requirement may be that the Application must transfer values from an HTTP parameter map to corresponding DataPoints. In this case, the Application may implement a DataMapAuditor, in the form of an HTTP Auditor, which receives a notification for every DataPoint subject to the rot DataMap hierarchy. The Application can then audit the DataMap and use the ephemeral ID of the DataPoint to search for values in the HTTP parameter map, and update the value attribute of the DataPoint accordingly. The HTTP Auditor may also be implemented to use DataPoint's ValueConstraint to verify the HTTP value expression conforms and throw a program exception if it does not. Those skilled in the art will understand the broader applicability of DataMapAuditor 218 to other processing desired to be performed on all or selected portions of a DataMap 208 hierarchy. Another example of the use of DataMapAuditor 218 is illustrated below with reference to auto-calculations.

Figure 7:
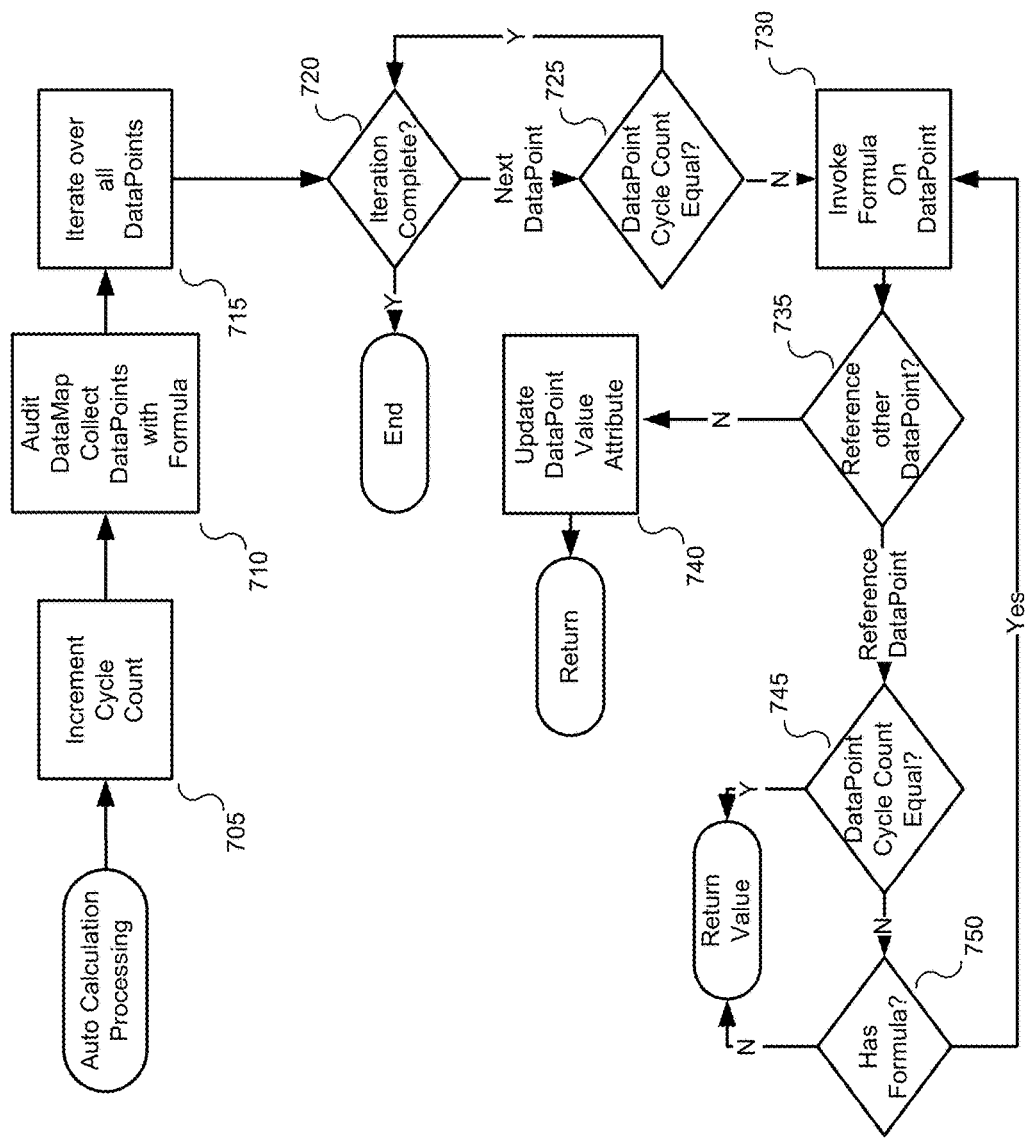
FIG. 7 is a flow diagram illustrating running auto-calculations of a datamap in accordance with an embodiment of the present invention.

FIG. 7 is a flow diagram illustrating running auto-calculations of a datamap in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

According to one embodiment, DataMapService 202 provides a method for running auto-calculations in which all DataPoints 220 having a Formula 222 are guaranteed to have their Formula invoked once during the auto-calculation cycle, resulting in an update to the value attributes 226 of the DataPoints 220.

According to the present example, auto calculation processing begins at block 705 by incrementing the cycle count.

At block 710, the DataMap is audited. At blocks 715 and 720 all DataPoints having a Formula are referenced and iterated over until complete. For each DataPoint in the iteration, the DataPoint's last cycle count is compared to the current cycle count at decision block 725. If they are the same, no action is taken and processing branches to decision block 720 to determine if the auto-calculation processing is complete. Otherwise, at block 730, the DataPoint's Formula is invoked on the DataPoint. For example, an invocation method of Formula receives a reference to the DataPoint it will update. From that DataPoint, the Formula may access any DataMap, DataNode or DataPoint within the DataMap hierarchy. At block 730, the DataPoint's last cycle count is assigned equal to the current cycle count.

The Formula may optionally access the value attributes from other DataPoints beginning with decision block 735. Accessing the value attribute of a DataPoint causes the DataPoint to compare its last cycle count with the current cycle count at decision block 745, if they are different and it has a Formula as determined by decision block 750, it invokes the Formula on itself at block 730; otherwise the process just returns its value attribute to the calling Formula.

If at decision block 735 it is determined the Formula does not reference other DataPoints, or has completed its reference of other DataPoints, the processing continues with block 740 to update the value attribute of its give DataPoint and returns to block 730 or decision block 720, depending on its leading sequence.

Figure 8:
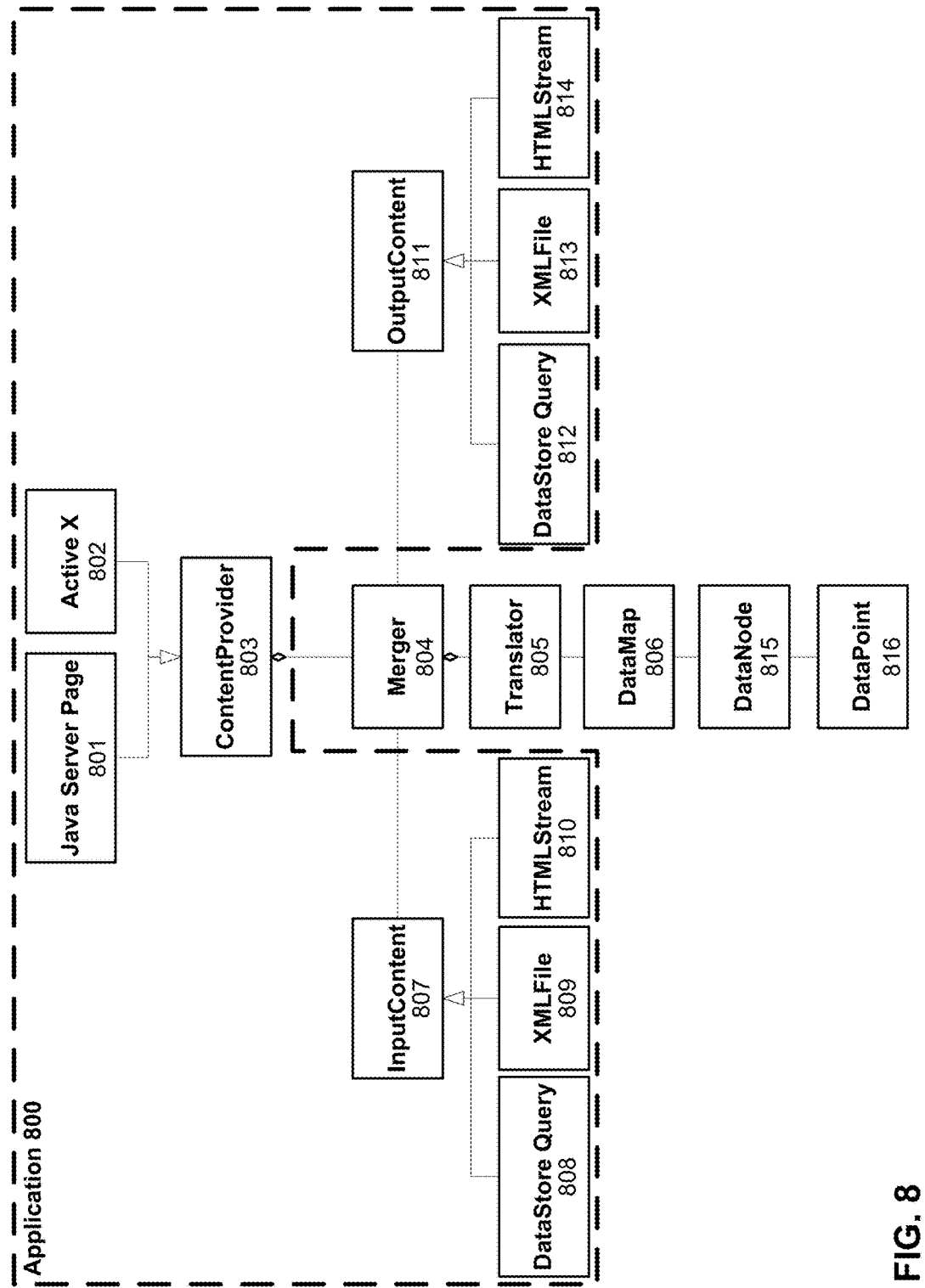
FIG. 8 illustrates various functional units of a datamap interface involved in merging content with input content to an application to create output content in accordance with an embodiment of the present invention.

FIG. 8 illustrates various functional units of a datamap interface involved in merging content with input content to an application to create output content in accordance with an embodiment of the present invention. In the present example, input content, such as InputContent 807, in the form of a data store query, such as DataStoreQuery 808, an Extensible Markup Language (XML) file, such as XMLFile 809, or an HTML steam, such as HTMLStream 810, is merged with information from a DataMap 806 using embedded tags (which include index paths as described further below) to create output content, such as OutputContent 811, in the form of a data store query, such as DataStoreQuery 812, an XML file, such as XMLFile 813, or an HTML stream, such as HTMLStream 814.

For example, as described further below with reference to FIG. 9, an Application 800 can instantiate a ContentProvider 803, a derivative of a merger class 804, to merge information contained in DataMap 806 with input content and write the merged (or translated) information to output content. ContentProvider 803 may be in many different forms, for example, a Java server page 801 or an Active X page 802.

The input content may emanate from different sources, for example an HTML stream (e.g., an HTML template as described further below), an XML file or a data store query. Similarly, output content may be of difference kinds, for example an HTML stream, an XML file or a data store query.

Figure 9:
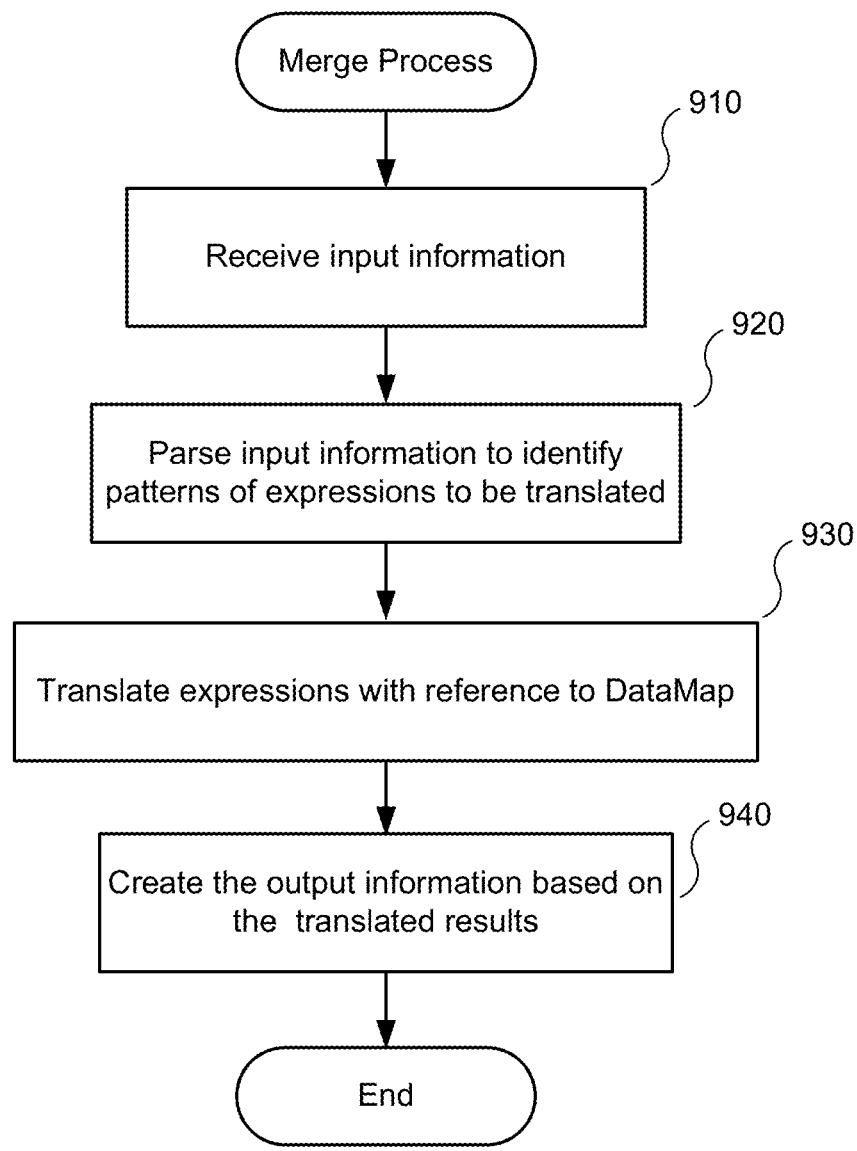
FIG. 9 is a flow diagram illustrating merge processing in accordance with an embodiment of the present invention.

FIG. 9 is a flow diagram illustrating merge processing in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 910, input information, e.g., InputContent 807, is received. The input information typically includes one or more index paths identifying data stored within one or more DataMaps 806. In one embodiment, the input information may be in the form of an HTML template having embedded tags that include or reference index paths.

At block 920, the input information is parsed to identify patterns of expressions to be translated. According to one embodiment Merger 216 parses or analyzes the input information, searching for expressions that will determine content to be replaced by Translator 217. For example, Merger 216 may identify and extract various portions of index paths found in the input content for translation by Translator 717.

At block 930, the identified expressions are translated with reference to the DataMap. For example, Translator 217 may replace an expression referring to a value attribute of a DataPoint with the value currently stored by the value attribute.

At block 940, the merge process creates the output information based on the translated results. As illustrated and discussed further below, in one embodiment, in which an HTML template (with embedded tags containing index paths) is the input content, the HTML template also serves as the output template into which the translated results are merged by replacing the index paths with the translated results supplied by the Translator 805.

According to one embodiment, the merge process is initiated by ContentProvider 803, implemented by the Application 800. ContentProvider 803 may be in many forms, for example a Java Server Page 801 or an Active X page 802.

ContentProvider 803 creates a Merger 804 and a Translator 805 and has a reference to a fully allocated DataMap 806, InputContent 807, and OutputContent 811. Contentprovider 803 configures the Merger 804 to reference the InputContent 807, Translator 805 and OutputContent 811 and configures the Translator 805 to reference the existing DataMap 806.

FIG. 10 is a screen shot of a web enabled spread sheet application 1000 built upon the data store interface technology in accordance with an embodiment of the present invention. The following example is simply one example of how a software programmer might develop the equivalent of a web-enabled spread sheet application using the data store interface technology described herein. As such, the following example is intended to facilitate understanding of embodiments of the present invention, but is not intended to limit the generality of embodiments of the present invention.

In the context of the present example, it is assumed an application requires a web server to provide HTML pages that allow a user of a client system to fill out a bill of order via a browser-based interface. A sample layout of an HTML page 1000 as rendered on the user's client computer system is shown in FIG. 10.

According to this example, the HTML page 1000 allows the user to input customer information, add/update and remove order items and input sales tax rate. Additionally, for each order item, a user may input a quantity, description and item cost. On submittal of the page to the web server (i.e., upon selecting the "UPDATE" button), the application automatically calculates an item's extended cost; and the order's sub total, sales tax, shipping and order grand total.

The user is able to update any of the fields that are outlined by a border. Items may be removed by clicking the icon to the left of the row, and a new item may be introduced by clicking the icon to the left of and under the last row. The user may submit the page to update the calculated values by clicking the "UPDATE" button.

Page 1000 is constructed by merging a DataMap containing the information displayed in the example with HTML content (e.g., an HTML template file) containing desired layout and embedded tags. The HTML content containing embedded tags will be referred to as an "HTML template". Creation of a DataMap definition and an HTML template is typically a manual task performed by the application developer.

The application information shown on the page includes:
(i) Customer Information (Name, Address, City, State, Zipcode and Phone),
(ii) Order Items (Qty, Description, Cost, Ext)
(iii) Miscellaneous (Tax Rate, Sub-Total, Tax, Shipping & Grand Total).

Figure 11:
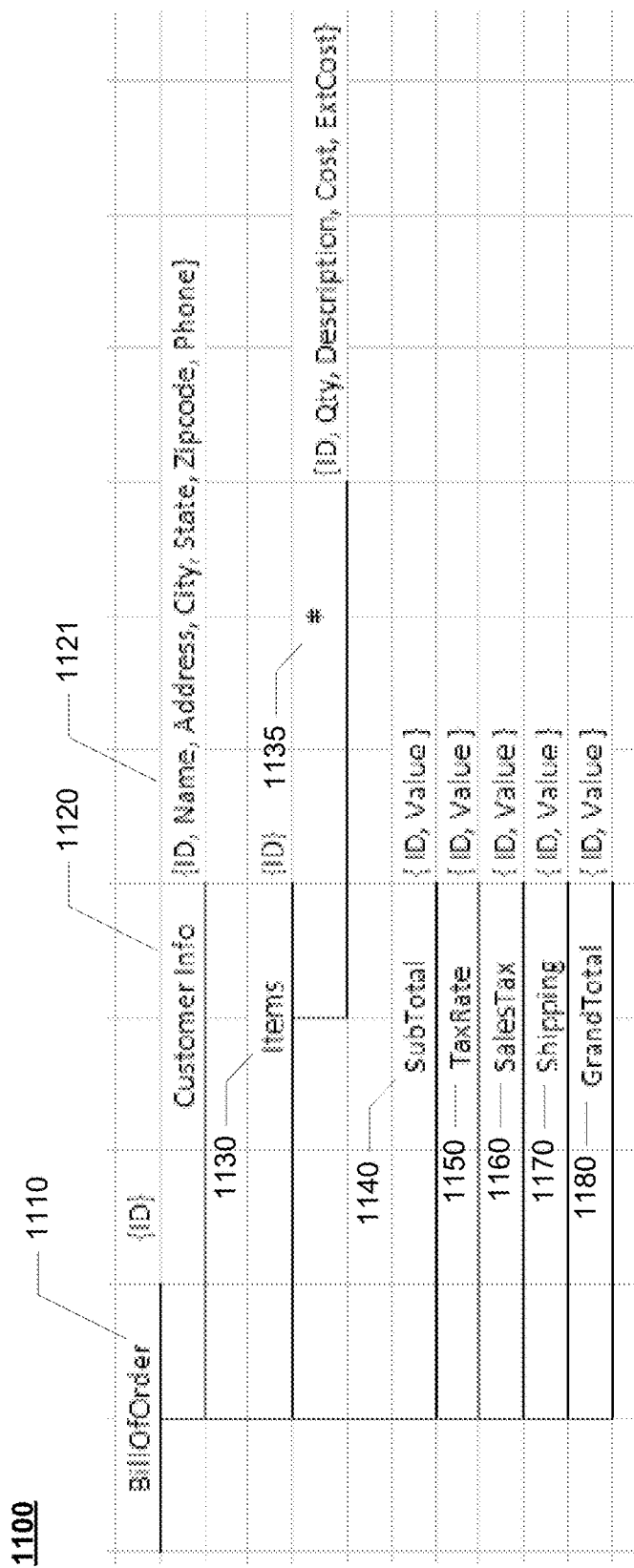
FIG. 11 illustrates a DataMap design for the web enabled spread sheet application of FIG. 10.

FIG. 11 illustrates a DataMap design 1100 for the web enabled spread sheet application of FIG. 10. While a design (or structure) of a DataMap may be arbitrary, it is helpful if the design corresponds to how the data is applied by the application at issue. The organization of the data, for example, may be influenced by how the data is displayed, dependencies among the data, or other factors. For this example, the diagram in FIG. 11 depicts an exemplary DataMap design 1100 that may be used.

In the current example, BillOfOrder 1110 is considered the "root" DataMap, and has (7) sub-DataMaps: CustomerInfo 1120, Items 1130, SubTotal 1140, TaxRate 1150, SalesTax 1160, Shipping 1170 and GrandTotal 1180. The Items DataMap 1130 has an "iterator" sub-DataMap, as denoted by the asterisk, '*'. A set of sub-DataMaps denoted by the iterator asterisk implies the size of the set is variable.

Each DataMap has one node (or formally DataNode) that references 0 or more DataPoints. In FIG. 11, the values enclosed by the curly braces, '{',','}', represent DataPoints that are associated with the DataMap's node.

While it is not necessary, in many cases, a group of DataPoints corresponds to a group of columns in a database table. In this example, all nodes have an 'ID' DataPoint. This example assumes each of the nodes is based on a corresponding table in a database. BillOfOrder 1110 and Items 1130 are based on a table containing just an ID, CustomerInfo 1120 is based on a table with an ID, Name, Address, City, State, Zipcode and Phone. The iterator node 1135 is based on a table with ID, Qty, Description, Cost and ExtCost. Nodes, SubTotal 1140, TaxRate 1150, SalesTax 1160, Shipping 1170 and GrandTotal 1190 are based on a table with an ID and a Value.

Generally, the name associated with a DataMap is used to reference the DataMap from its parent. For example, from the BillOfOrder DataMap 1120, the expression "CustomerInfo" is used to reference the CustomerInfo sub-DataMap 1120.

For iterators, the key is established by the application, and the ephemeral ID of the DataMap is commonly used. In all cases, for a given set of sub-DataMaps, their reference keys are unique in comparison to each other.

The name associated with a DataPoint is used to reference a DataPoint and is unique in comparison to all other keys referencing a collection of DataPoints relative to a DataMap's DataNode. For example, the expression "Name" is used to reference the Name DataPoint 1121 relative to a CustomerInfo DataNode 1120.

Figure 12:
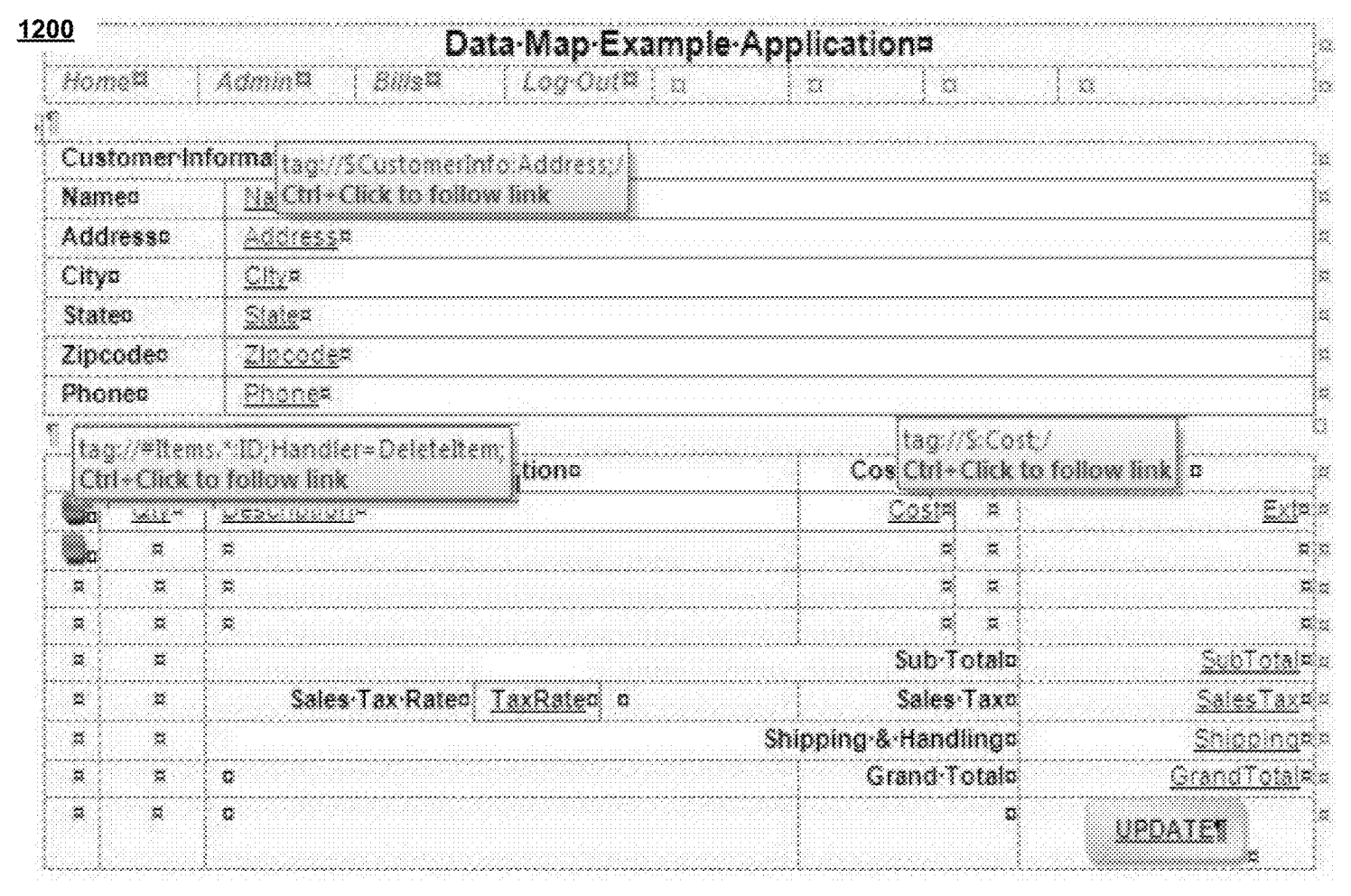

FIG. 12 illustrates an unmerged HTML template file corresponding to the screen shot of FIG. 10. In the context of the present concrete example, the HTML page delivered to the browser is created by merging an HTML template with a DataMap. The merge process translates the embedded tags (in the HTML template) into programmatic instructions on how to gather information from a DataMap and blend it into the final HTML content that is sent to the browser. In most cases, the HTML template is contained in an HTML file. The HTML template file may be created using any ASCII text editor and typing in the HTML code directly, or an editor that automatically generates HTML code, such as office tools from Microsoft or Oracle. The editor is assumed to allow a designer to specify embedded tags (i.e., hyperlinks) that are used by the merge process.

An example of an unmerged HTML template file 1200 is shown in FIG. 12. Some of the embedded tags are also shown in support of this discussion. Within the actual HTML code, an embedded tag is a standard anchor tag '<a/>', with an href value that begins with: tag://. In the current example, the editor displays the embedded tags without the anchor and href assignment. Consequently, the actual HTML code for the "Cost" tag would look be as follows:

<a href="tag://$:Cost;/">Cost</a>

The merge process described above provides the basis for the embedded tag language requirements. As described in more detail below with reference to FIG. 13, the language definition that dictates the syntax of the embedded tag supports the declaration of one optional DataPoint index path; and/or an arbitrary number of attribute-value pairs, where the value expressions may also represent a declaration of a DataMap or DataPoint index path.

In FIG. 12, the index path for the customer's Address DataPoint is "CustomerInfo:Address". The expression to the right of the colon correspond to a DataPoint. Expressions to the left of the colon, ':', correspond to DataMap keys. Multiple DataMap keys are separated by the dot, '.', or period character. In FIG. 12, the index path "Items.*:ID" contains (2) DataMap keys (Items, *) and a DataPoint key (ID). Expressions with keys surrounded by square brackets ('[',']') are called indirect keys.

During the merge process, when an embedded tag is encountered, the content starting from the left chevron (i.e., '<') of the start anchor to the right chevron (i.e., '>') of the close anchor is replaced with contents generated by the application using a software component called a merge translator. Complicated translations may inject sophisticated HTML and javascript code. More profound is the common and simplest case where the translation is merely the ASCII contents of the DataPoint's data. As a result, constructing a DataMap and matching HTML template is no more complicated than creating a spreadsheet that references rows and columns.

Figure 13:
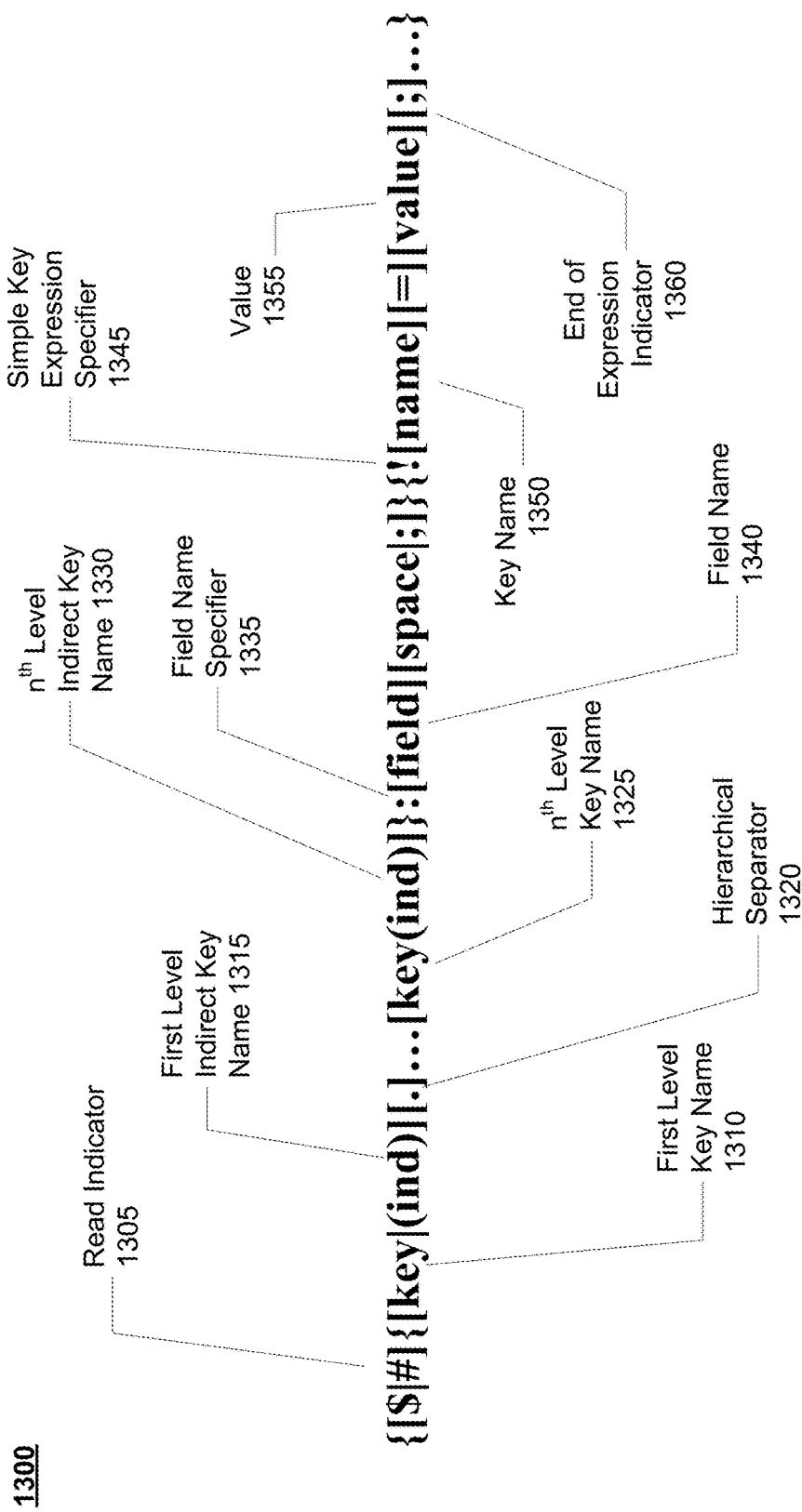
FIG. 13 illustrates a representation of an index path in accordance with an embodiment of the present invention.

FIG. 13 illustrates an index path expression 1300 in accordance with an embodiment of the present invention. In one embodiment, in which InputContent 807 is HTML or XML, one possible pattern that can be parsed and recognized by Merger 804 is a properly formatted index path within an embedded tag, for example.

In the depicted index path expression 1300, square brackets enclose required content, the curly brackets enclose optional content.

In an embodiment in which this type of index path expression 1300 is employed within embedded tags of an HTML template, for example, once the string "<tag://" is encountered, it would be followed by a '$', '#' or '!'.

'$' and '#' are read indicators 1305 in the context of the current example. Both specify that an expression suitable for creating parameters to index into a DataMap hierarchy follows. In one embodiment, '$' is used as a "read/write" reference; and '#' is used as a "read/only" reference. A simple key expression specifier 1345 (i.e., an exclamation point '!' in the context of the present example) specifies that an expression suitable for constructing a simple key and value pair follows. Those skilled in the art will recognize the particular characters used as indicators, separators and specifiers are arbitrary and alternative characters or sets of characters, numbers or symbols can be used.

Continuing with the present example, following the read indicator 1305 is either a field name specifier 1335 (i.e., a semi-colon ':' in the context of the present example), an open parenthesis (i.e., '(') or any other character. The presence of the field name specifier 1335 (i.e., a colon ':' in the context of the present example) specifies a field name is to follow. An open parenthesis (i.e., '(') specifies an indirect key name is to follow; otherwise a [regular] key name is to follow.

Indirect key names include all characters following the '(', leading up to the close parenthesis (i.e., ')'). In the context of the current example, the ')' must immediately be followed by the field name specifier 1335 or a hierarchical separator 1320 (i.e., a period '.' In the context of the present example).

According to one embodiment, the Application 800 provides Merger 804 with a resource map (e.g., HashMap 206) that Merger 804 uses to translate an indirect key to a [regular] key name.

Regular key names follow the read indicator 1305 or the hierarchical separator. Regular key names include all characters following the read indicator 1305 or the hierarchical separator 1320, leading up to the field name specifier 1335 or another hierarchical separator 1320.

The hierarchical separator 1320 may be followed by '(' or any regular key character; where '(' specifies an indirect key follows.

A field name immediately follows the field name specifier 1335 and may include any character except an end of expression indicator 1360 (i.e., a semi-colon ';' in the context of the present example) or a blank space as an end of expression indicator or blank space specify the end of the expression for the field.

In the context of the present example, the field name specifier 1335 must immediately follow $, #,) or the final regular key name of the hierarchical key chain expression.

Following a simple key expression specifier 1345 (i.e., an exclamation point '!' in the context of the present example) is an expression for a simple key and may include any character except an equal sign '='; the character '=' specifies an expression for a simple value, corresponding to the key name 1350, the expression follows, and may include any character except the end of expression indicator 1360. The character, ';', specifies the end of the expression for the value 1355, corresponding to the key.

In the index path expression 1300 more than one key name and/or indirect key name may appear. The first key name to appear prior to the hierarchical separator 1320 is referred to as the first level key name 1310. If, instead, the first key name to appear is an indirect key name, then it is referred to as the first level indirect key name 1315. Following this convention, key names appearing after a first hierarchical separator 1320 and before a second hierarchical separator would be referred to as second level keys and so on. Since a variable number of key names may appear prior to the field name specifier 1335, the last key in the index path expression 1300 is referred to as the nth level key name 1325. If the last key in the index path expression 1300 is an indirect key, then it is referred to as the nth level indirect key name 1325.

For clarity, it is noted that the first level key name 1310 or the first level indirect key name 1315 refer to a root DataMap, whereas a second level key name or indirect key name refers to a second-level DataMap (a DataMap that is a sub-DataMap of the root DataMap).

Using the example index path expression discussed above (or any other regular expression defined by the particular implementation), Merger 804 is capable of detecting an embedded tag, creating parameters to index in to the DataMap hierarchy to reference DataMaps 806 and/or DataPoints 816; and is able to provide Translator 805 with additional key/value pairs that it may use to determine a policy or algorithm for translating the value attribute to an expression suitable for OutputContent 811. For example, the embedded tag:

<tag://$Cust.Ord.Desc:VAL;    !Handler=*T*Area;!*R*=4; !*C*=80;> may be used to reference the "Cust" DataMap from the root DataMap; reference the "Ord" DataMap from the "Cust" DataMap; reference the "Desc" DataMap from the "Ord" DataMap; reference the "VAL" DataPoint within the "Desc" DataMap. Translator 805 may use the additional key/value pairs to create a text area HTML tag having 4 rows and 80 columns, set the ID of the HTML tag equal to the ephemeral ID of the DataPoint and initialize the content of the text area HTML equal to the value attribute of the DataPoint.

In another example, the embedded tag:

<tag://#Order.LineItems.*:COST;> may be used to reference the "Order" DataMap from the root DataMap; reference the "LineItems" DataMap from "Order" DataMap; and interpreting '*' as the "wildcard", for every DataMap subordinate to LineItems; reference the "COST" DataPoint within the DataMap. Translator 805 may provide a list HTML tag, or a table HTML tag, causing a list of the cost of all line items to be displayed; and use the DataPoint's Format to set font size and style.

In yet another example, the embedded tag:
<tag://#Order.LineItems.[ITEM]COST;>
may be used to reference the "Order" DataMap from the root DataMap; reference the "LineItems" DataMap from "Order" DataMap; translate the indirect key, "ITEM" to a regular key that is used to reference a specific DataMap that is subordinate to the "LineItems" DataMap; and reference the "COST" DataPoint within the line item DataMap.

FIG. 14 illustrates a simple web-based tool 1400 used to manage and store DataMap definitions in accordance with an embodiment of the present invention. Once the developer establishes the requirements for the page layout and the design of the DataMap, they may proceed to use an appropriate HTML editor to create the HTML template and embed the tags appropriate to the application.

The merge process is generally provided an instantiated DataMap—the condition where all the sub-DataMaps, DataNodes and DataPoints have been loaded into program memory. Before a DataMap can be instantiated, there must be a corresponding definition. The DataMap definition is assumed to be stored in some database of the computer file system, and retrieved on demand by the application. The form and medium of storage depends on the tool used to create the definition and the software component (DataMapService) that loads the definition from storage. An XML file is an excellent means of storing a DataMap definition, and a simple ASCII editor would be the tool. However, this example references a web based tool that is used to manage and store DataMap definitions in a Lentiles database as described in U.S. Pat. No. 7,412,455 (previously incorporated by reference).

FIG. 15 illustrates a simple interface 1500 that provides a user with links to create a new DataMap definition in accordance with an embodiment of the present invention. In one embodiment, when the user clicks the "New Def" link 1410 of web-based tool 1400, the interface 1500 of FIG. 15 is displayed via the browser-based interface of the user's client system.

Using interface 1500, a user can define the name of the root DataMap, BillOfOrder 1510, and the following sub-DataMaps: CustomerInfo 1520, GrandTotal 1530, Items 1540, SalesTax 1550, SubTotal 1560 and TaxRate 1570. Each of these DataMaps has associated with them a Global locator and Data Source 1575. The Global locator is optional and used by DataMapService to reference a DataMap using the Global expression (in lieu of parsing an index path). The expression for a Global locator is unique for all Global locators used to reference a DataMap.

The Data Source 1575 is a component of software that is responsible for establishing or retrieving data that are accessible through DataPoints. The software developer is responsible for obtaining or implementing a Data Source software component. The expression provided in this interface may correspond to literal 4GL, Java or C++ code, or reference a software class that is accessible by the application. In the case of literal code, the application compiles and/or interprets the code to perform appropriate initialization.

Two DataMaps, CustomerInfo 1520 and Items 1540 have sub-DataMaps. The process for defining a sub-DataMap begins by clicking the name of the parent DataMap.

Figure 16:
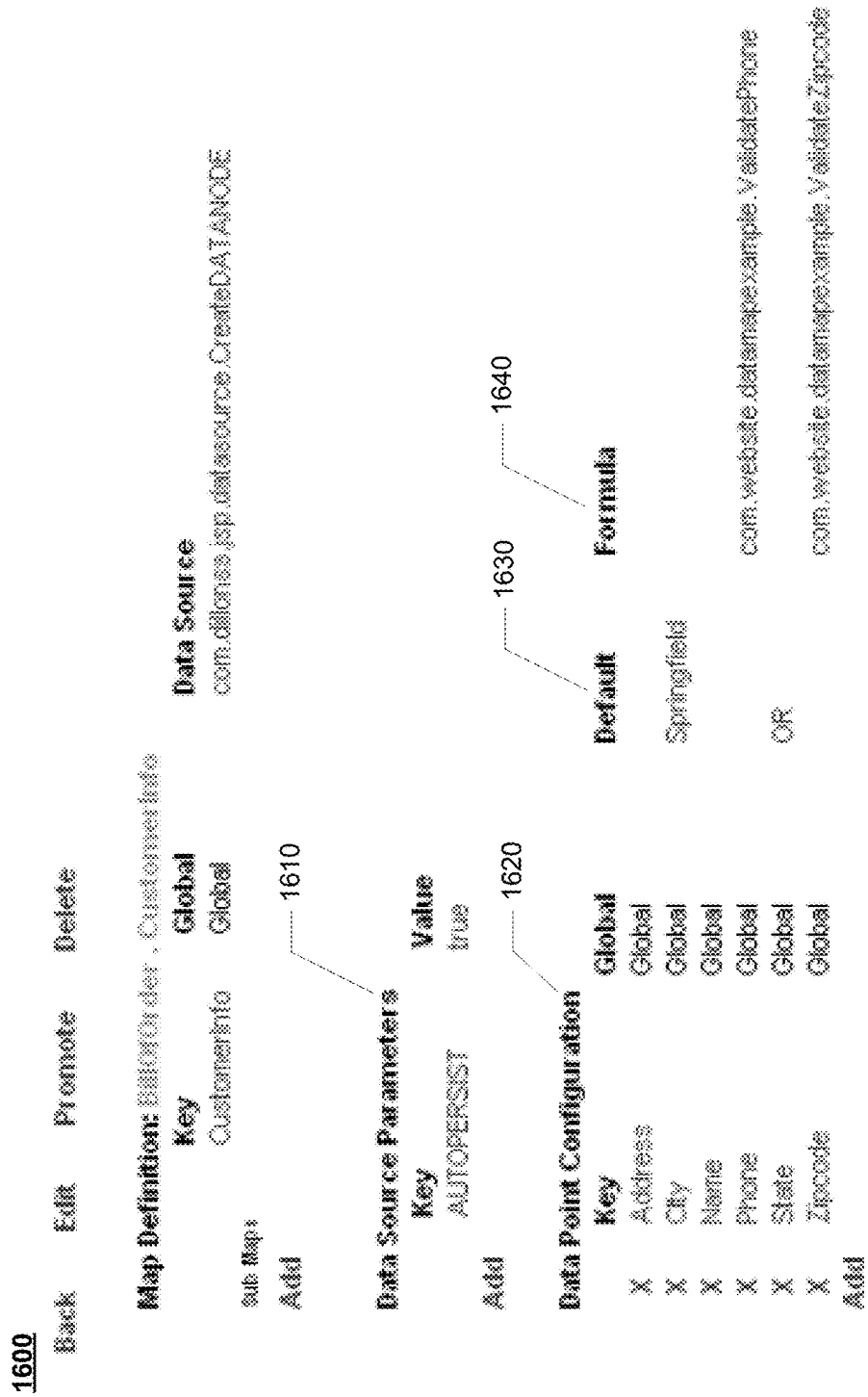
FIG. 16 illustrates configuration of the CustomerInfo sub-DataMap of the BillOfOrder DataMap of FIG. 15 in accordance with an embodiment of the present invention.

FIG. 16 illustrates configuration of the CustomerInfo sub-DataMap 1520 of the BillOfOrder DataMap 1510 of FIG. 15 in accordance with an embodiment of the present invention. In the current example, responsive to user selection of the CustomerInfo sub-DataMap 1520, interface 1600 is displayed.

A Data Source has available to it any configured Data Source Parameters 1610. In this example, there is one Data Source Parameter declared: AUTOPERSIST=true. The declaration of Data Source Parameters 1610 is arbitrary and dependent on the requirements of the Data Source software that initializes the DataMap(s) and their DataPoints. Sometimes a Data Source Parameter is used as a qualifying value in a database query expression. In other cases, a Data Source Parameter is used to conditionally enable some program logic. Yet, in other cases, a Data Source Parameter is used to construct part of a DataMap or DataPoint index path. Its use and application is unbounded.

Interface 1600 also shows examples of optional DataPoint configurations 1620. Each DataPoint may be optionally configured, and is referenced by its key expression. In this example, interface 1600 shows configurations for all defined DataPoints: Address, City, Name, Phone, State and Zipcode.

Like a DataMap, a DataPoint may have a Global locator, and is used by DataMapService to quickly reference a DataPoint. The expression for a Global locator must be unique for all Global locators used to reference a DataPoint.

DataPoint configurations 1620 provide an optional default value 1630. Default values 1630 are applied if a DataPoint value is undefined. For example, if a new record is created for a customer, and City is undefined, then "Springfield" will be assigned the value for City.

DataPoint configurations 1620 provide an optional formula 1640. Formulas 1640 are invoked when the application calls upon DataMapService to run an auto-calculation cycle, or invoke a named method, for example. According to one embodiment, the expression for the formula may include literal 4GL, Java or C++ code, or reference a software class that is accessible by the application. In the case of literal code, the application compiles and/or interprets the code to perform appropriate logic.

Figure 17:
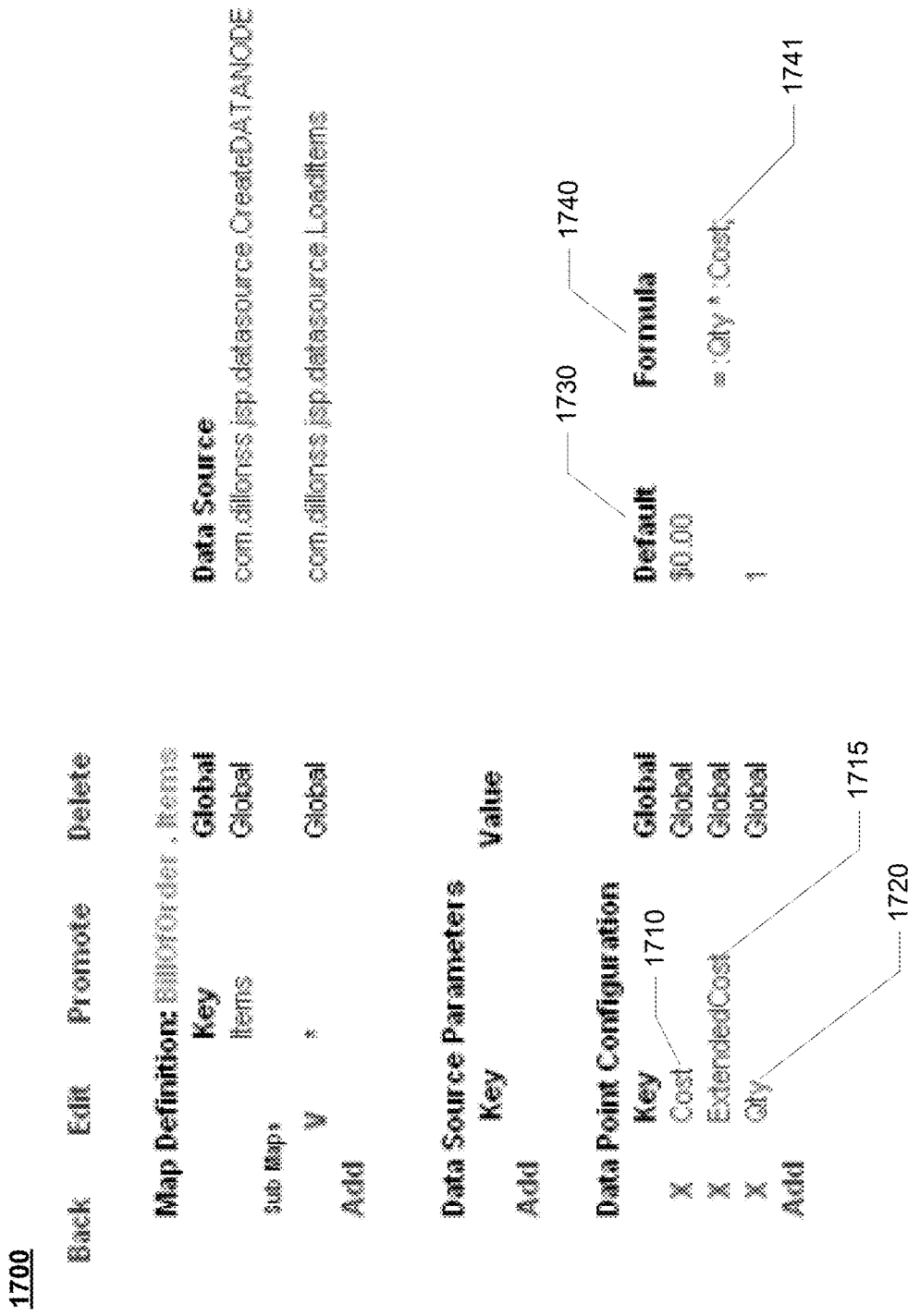
FIG. 17 illustrates configuration of the Items sub-DataMap of the BillOfOrder DataMap of FIG. 15 in accordance with an embodiment of the present invention.

FIG. 17 illustrates configuration of the Items sub-DataMap 1540 of the BillOfOrder DataMap 1510 of FIG. 15 in accordance with an embodiment of the present invention. The configuration of "Items" and an "iterator" will now be described with reference to interface 1700. The iterator is denoted by the asterisk, '*'.

In this example, the Data Source, "com.dillonss.jsp.datasource.LoadItems", is responsible for loading all order items (i.e., from storage). This particular Data Source may create multiple DataMaps, and is presumed to use an order item's ephemeral ID as the DataMap key.

Interface 1700 also demonstrates specifying default values 1730 for Cost 1710 and Qty 1720, and a literal formula 1741 that calculates the ExtendedCost 1715 as the product of Qty 1720 and Cost 1710.

Figure 18:
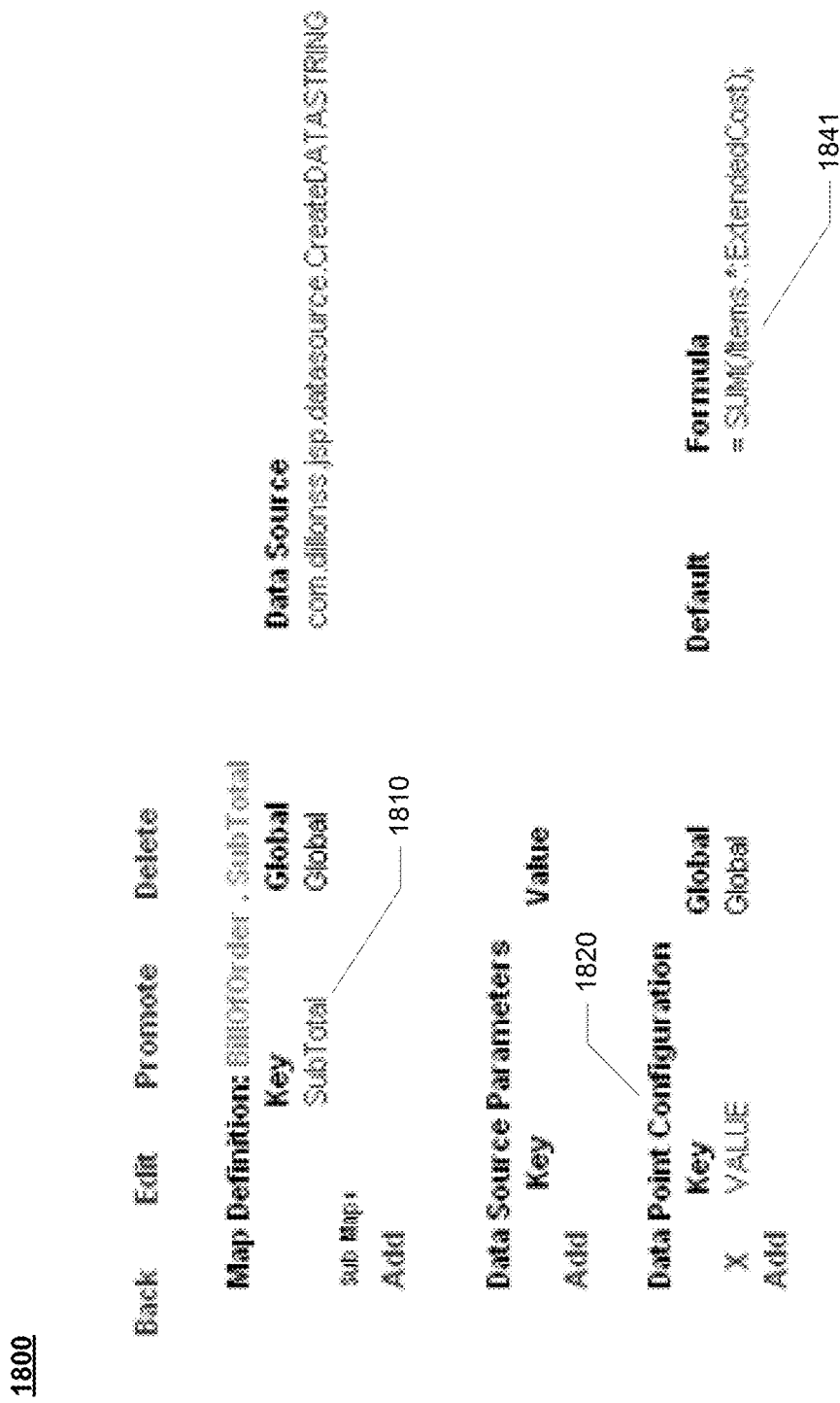
FIG. 18 illustrates configuration of the SubTotal of the BillOfOrder DataMap of FIG. 15 in accordance with an embodiment of the present invention.

FIG. 18 illustrates configuration of the SubTotal 1560 of the BillOfOrder DataMap 1510 of FIG. 15 in accordance with an embodiment of the present invention. Interface 1800 shows the configuration for SubTotal 1810 and a literal formula 1841 showing how to sum the value of all ExtendedCosts.

Other DataPoint configurations 1820 are also available and may be used to apply display formats, establish conformance to boundary conditions, and more.

At this point in the example, it is assumed the developer has created an HTML template and a DataMap definition. A DataMapService is the software component that loads the DataMap definition, and uses that definition to instantiate a DataMap. Continuing this example, what happens when a user accesses the order page from their browser is now discussed with reference to FIG. 19.

Figure 19:
FIG. 19 illustrates the screen shot of FIG. 10 responsive to an updated quantity in accordance with an embodiment of the present invention.

FIG. 19 illustrates the screen shot of FIG. 10 responsive to an updated quantity in accordance with an embodiment of the present invention. Responsive to the user pointing their browser to a Uniform Resource Locator (URL) that causes the web server to run the application, the application determines it needs to allocate a DataMapService and return content formed by merging the service's DataMap with an HTML template.

The DataMapService first loads the DataMap definition from storage, and then begins the process of instantiating DataMaps by invoking the Data Source methods, in hierarchical order, according to the DataMap definition.

In one embodiment, the merge process requires four primary elements: (i) The DataMap, (ii) HTML template content, (iii) a tag parser and a (iv) tag translator. The tag parser takes in an HTML template and outputs translated HTML content. The input HTML is directly conveyed to the output unaltered, with the exception of embedded tags. Embedded tags are parsed into an object model representing the tag and passed to the tag translator in exchange for content. The tag translator necessarily is provided a reference to the original DataMap, to allow it to index into the DataMap and reference other DataMaps or DataPoints as appropriate.

Assume for now, the user accesses the order for the first time since the order was earlier created. The application merges the DataMap with the HTML template and the HTML page depicted in FIG. 10 is returned to the browser.

If the user decides that 100 ¼-Inch Washers is too many, and only 50 are required. The user can update the quantity field to 50 and click the "UPDATE" button.

The web server and application receives the resulting HTTP request, processes the information, invokes the auto-calculation cycle, merges the DataMap and the HTML template and returns update HTML page 1900, which reflects the user's update from 100 to 50 ¼-Inch Washers as well as auto-calculated resulting changes to extended cost 1910, sub total 1920 and grand total 1930.

Figure 20:
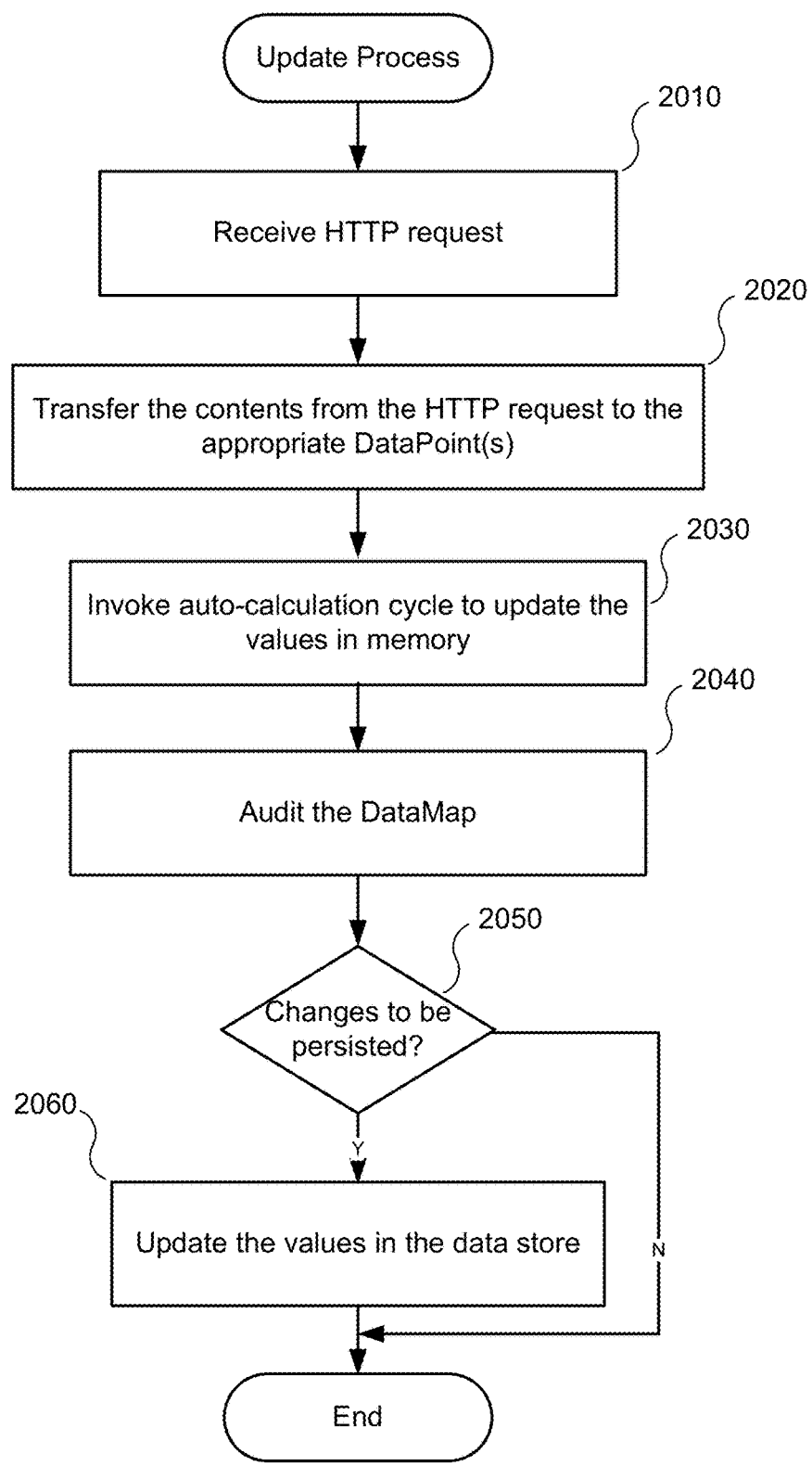
FIG. 20 is a flow diagram illustrating update cycle processing in accordance with an embodiment of the present invention.

FIG. 20 is a flow diagram illustrating update cycle processing in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 2010, an HTTP request is received by the web server. According to one embodiment, responsive to user activation of the "UPDATE" button, the browser transmits an HTTP request to the web server containing a reference to each of the input fields and their values at the time the update request was initiated. The application delegates the HTTP request to the DataMapService so that the values of the in-memory DataPoints and/or the corresponding DataPoints stored in non-volatile memory on disk, for example, can be updated appropriately.

At block 2020, the contents of the HTTP request are transferred to the appropriate DataPoint(s). In one embodiment, each DataMap and DataPoint within the DataMapService has a unique ephemeral ID associated with it. The ephemeral ID is valid for as long as the application retains reference to the DataMapService. The ephemeral ID is used to reference its corresponding DataMap or DataPoint. Any input field in the browser page that corresponds to a DataPoint, has associated with it the DataPoint's ephemeral ID. Therefore, when the application receives an HTTP request, DataMapService can easily transfer the contents from the HTTP request to the appropriate DataPoint.

At block 2030, an auto-calculation cycle is invoked to update the values in memory. According to one embodiment, once the HTTP values have been transferred to the DataPoints, the application calls on DataMapService to invoke an auto-calculation cycle, e.g., the auto-calculation cycle described above with reference to FIG. 7. Doing so causes each DataPoint having a declared formula to invoke its formula once and thereby causing its associated value to reflect the current, collective, state of the DataMap.

At block 2040, the DataMap is audited to determine if any DataNodes or DataPoints have changed. According to one embodiment, once the HTTP values have been transferred and the formulas exercised, the application may choose to update the values in storage. The application may do this by auditing the DataMap to determine if any DataNodes or DataPoints have changed and should be persisted to storage.

At decision block 2050, it is determined if any changes are to be persisted. In one embodiment, all DataNode and DataPoint that have changed are persisted by invoking a PersistAuditor, for example. In some embodiments, due to the frequency of change of certain data, the relative importance of certain data or other factors, such as reducing the load on the server, some data may be persisted to storage less often than other data. For example, some data may be persisted on every in-memory update, while other data may change in-memory and yet be persisted only after a configurable time period has elapsed.

At block 2060, the values in the data store are updated. Once this step is complete, the application can respond by merging the updated DataMap with the HTML template and the process repeats. Alternatively, persisting changes to storage can be a background process and the updated in-memory version of the DataMap can be merged with the HTML template to create an HTML file for delivery to the client system prior to completion of the persisting process.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   caching into a hierarchical data map comprising a random access memory-resident data structure, by an application running on a server computer system, data from a database associated with the server computer system, by instantiating a plurality of data points within the hierarchical data map and assigning each data point of the plurality of data points an ephemeral ID that uniquely identifies the data point within the plurality of data points, wherein each of the plurality of data points also includes a name field and a value field;
   receiving, by the server computer system, a request from a client computer system, wherein the request contains a value to be stored within a particular data point of the plurality of data points and specifies the particular data point by its ephemeral ID;

responsive to the request:
  identifying, by the application, the particular data point to be updated by the request based on the ephemeral ID specified in the request;
  transferring, by the application, the value contained in the request to the value field of the particular data point; and
  persisting, by the application, changed contents within the hierarchical data map to the database.

2. The method of claim 1, wherein the particular data point further includes a formula and a calculated value field having a value based on the formula and wherein the method further comprises updating, by the application, the value of the calculated value field based at least on the formula and the value of the value field of the particular data point.

3. The method of claim 2, further comprising returning, by the application, the updated value of the calculated value field to the client computer system by copying the updated value of the calculated values field from the particular data point into a HyperText Markup Language (HTML) file, including the ephemeral ID of the particular data point within the HTML file and transmitting the HTML file to the client computer system.

4. The method of claim 3, wherein the request comprises a HyperText Transport Protocol (HTTP) request.

5. The method of claim 4, wherein the HTML file is formed by the application using an HTML template containing an embedded tag that includes or references an index path that can be used to index into the hierarchical data map.

6. The method of claim 5, wherein the index path comprises an expression, which when evaluated selects a subset of data points of the plurality of data points.

7. The method of claim 6, wherein the HTML file comprises the HTML template.

8. The method of claim 5, wherein the HTML template further contains information regarding a desired layout in accordance with which data returned by the application is to be displayed on the client computer system.

9. The method of claim 5, wherein the index path includes a key/value pair that identifies the particular data point.

10. A server computer system comprising:
  a non-transitory storage device having embodied therein instructions operable to process requests from a client computer system; and
  one or more processors coupled to the non-transitory storage device and operable to execute the instructions to perform a method comprising:
  caching into a hierarchical data map comprising a random access memory-resident data structure, by an application running on the server computer system, data from a database associated with the server computer system, by instantiating a plurality of data points within the hierarchical data map and assigning each data point of the plurality of data points an ephemeral ID that uniquely identifies the data point within the plurality of data points, wherein each of the plurality of data points also includes a name field and a value field;
  receiving, by the server computer system, a request from the client computer system, wherein the request contains a value to be stored within a particular data point of the plurality of data points and specifies the particular data point by its ephemeral ID;
  responsive to the request:
    identifying, by the application, the particular data point to be updated by the request based on the ephemeral ID specified in the request;
    transferring, by the application, the value contained in the request to the value field of the particular data point; and
    persisting, by the application, changed contents within the hierarchical data map to the database.

11. The server computer system of claim 10, wherein the particular data point further includes a formula and a calculated value field having a value based on the formula and wherein the method further comprises updating, by the application, the value of the calculated value field based at least on the formula and the value of the value field of the particular data point.

12. The server computer system of claim 11, further comprising returning, by the application, the updated value of the calculated value field to the client computer system by copying the updated value of the calculated values field from the particular data point into a HyperText Markup Language (HTML) file, including the ephemeral ID of the particular data point within the HTML file and transmitting the HTML file to the client computer system.

13. The server computer system of claim 12, wherein the request comprises a HyperText Transport Protocol (HTTP) request.

14. The server computer system of claim 13, wherein the HTML file is formed by the application using an HTML template containing an embedded tag that includes or references an index path that can be used to index into the hierarchical data map.

15. The server computer system of claim 14, wherein the index path comprises an expression, which when evaluated selects a subset of data points of the plurality of data points.

16. The server computer system of claim 14, wherein the HTML template further contains information regarding a desired layout in accordance with which data returned by the application is to be displayed on the client computer system.

17. The server computer system of claim 14, wherein the index path includes a key/value pair that identifies the particular data point.

18. The server computer system of claim 11, wherein the request comprises a HyperText Transport Protocol (HTTP) request and wherein the method further comprises returning, by the application, the updated value of the calculated value field to the client computer system by copying the updated value of the calculated values field from the particular data point into a HyperText Markup Language (HTML) file, including the ephemeral ID of the particular data point within the HTML file and transmitting the HTML file to the client computer system.

19. A non-transitory computer-readable storage medium embodying a set of instructions, which when executed by one or more processors of a server computer system, cause the one or more processors to perform a method comprising:
  caching into a hierarchical data map comprising a random access memory-resident data structure, by an application running on the server computer system, data from a database associated with the server computer system, by instantiating a plurality of data points within the hierarchical data map and assigning each data point of the plurality of data points an ephemeral ID that uniquely identifies the data point within the plurality of data points, wherein each of the plurality of data points also includes a name field and a value field;
  receiving, by the server computer system, a request from a client computer system, wherein the request contains a value to be stored within a particular data point of the plurality of data points and specifies the particular data point by its ephemeral ID;

responsive to the request:
- identifying, by the application, the particular data point to be updated by the request based on the ephemeral ID specified in the request;
- transferring, by the application, the value contained in the request to the value field of the particular data point; and
- persisting, by the application, changed contents within the hierarchical data map to the database.

20. The non-transitory computer-readable storage medium of claim 19, wherein the particular data point further includes a formula and a calculated value field having a value based on the formula and wherein the method further comprises updating, by the application, the value of the calculated value field based at least on the formula and the value of the value field of the particular data point.

* * * * *